United States Patent
Von Gal, Jr. et al.

[15] 3,682,290
[45] Aug. 8, 1972

[54] CAN PALLETIZER

[72] Inventors: George E. Von Gal, Jr., 3408 Thomas Ave.; Mabry S. Phillips, Jr., 3144 Woodfern Dr.; Lawrence A. Hutchinson, 3431 Cloverdale Rd., all of Montgomery, Ala. 36104

[22] Filed: Oct. 31, 1969

[21] Appl. No.: 873,054

[52] U.S. Cl..................198/21, 198/31 AA, 214/6 FS
[51] Int. Cl............................................B65g 47/42
[58] Field of Search.....214/6 H, 6 K, 6 P, 6 FS, 6 M, 214/6 N; 198/21, 24, 30, 31 AL; 53/61

[56] References Cited

UNITED STATES PATENTS

| | | | |
|---|---|---|---|
| 2,470,795 | 5/1949 | Socke | 214/6 N X |
| 2,514,067 | 7/1950 | Jackson et al. | 198/31 AL |
| 2,835,375 | 5/1958 | McGihon | 198/31 AL |
| 3,199,651 | 8/1965 | Lobik | 198/24 |
| 3,219,203 | 11/1965 | Jeremiah | 214/6 N |
| 3,224,549 | 12/1965 | Cella et al. | 198/30 |
| 3,250,371 | 5/1966 | Cella et al. | 198/21 |
| 3,431,698 | 3/1969 | Bathellier | 53/61 |
| 3,477,201 | 11/1969 | Small | 214/6 H X |

*Primary Examiner*—Robert J. Spar
*Attorney*—Newton, Hopkins & Ormsby

[57] ABSTRACT

This invention relates generally to a handling system and method of arranging a group of cans into a predetermined pattern and thereafter transferring successive groups of arranged cans to a pallet to form a series of layers of cans thereon. More particularly this invention includes an endless conveyor means for successively feeding a series of cans along a first predetermined path with means located adjacent said endless conveyor for arranging cans moving along the endless conveyor into two rows of longitudinally staggered cans as they move along the conveyor. Operatively associated with the can feeding and orienting means adjacent one end thereof is pushover mechanism for moving substantially simultaneously the two rows of the oriented cans from the conveyor onto an accumulator tray. A receiving pallet means is supported adjacent the can accumulator means. A carriage support mechanism is supported above the accumulator and the receiving pallet for transferring a group of the oriented cans from the accumulator to the receiving pallet in such a manner as to form a series of layers of the cans on the receiving pallet. A slip-sheet layer separator means is disposed adjacent the receiving pallet and beneath the carriage transfer means. The carriage transfer means includes a magnetic pick-up head for engaging and picking up a layer of oriented cans from the accumulator and transferring the cans to the receiving pallet. Also disposed on the carriage adjacent the magnetic pick-up head is a vacuum pick up head which is detailed for engaging a slip-sheet layer separator means. The magnetic pick-up head and the vacuum pick-up head are operatively associated with each other and controlled in such a manner that as the magnetic pick-up head moves from a position over the can accumulator means to a position over the receiving pallet, the vacuum pick-up head will move concurrently therewith to a position over the slip-sheet layer separator means for engaging and picking up a slip-sheet layer separator, and as the carriage is moved to position the magnetic pick-up head over the accumulator tray, the vacuum pick-up head is moved to a position to deposit a slip-sheet layer separator on top of a layer of oriented cans which have been stacked on the receiving pallet. Operatively associated with the receiving pallet means is a pallet magazine which contains a series of pallets. The pallet magazine includes means for dispensing pallets individually to the pallet receiving station as they are required. A conveyor means is operatively associated with the receiving pallet means for transferring a loaded pallet away from the palletizing station for further handling as required.

9 Claims, 35 Drawing Figures

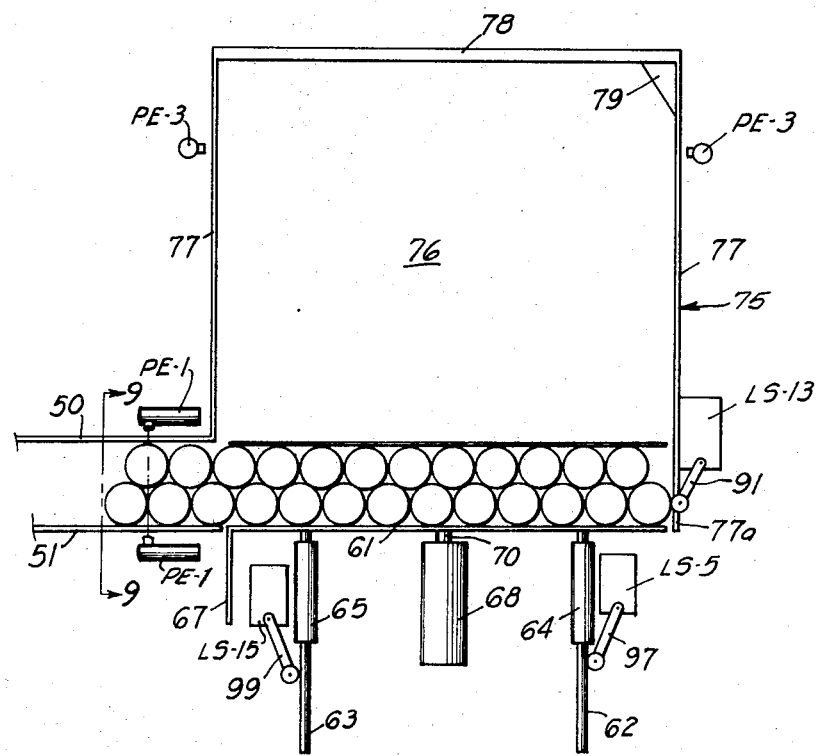

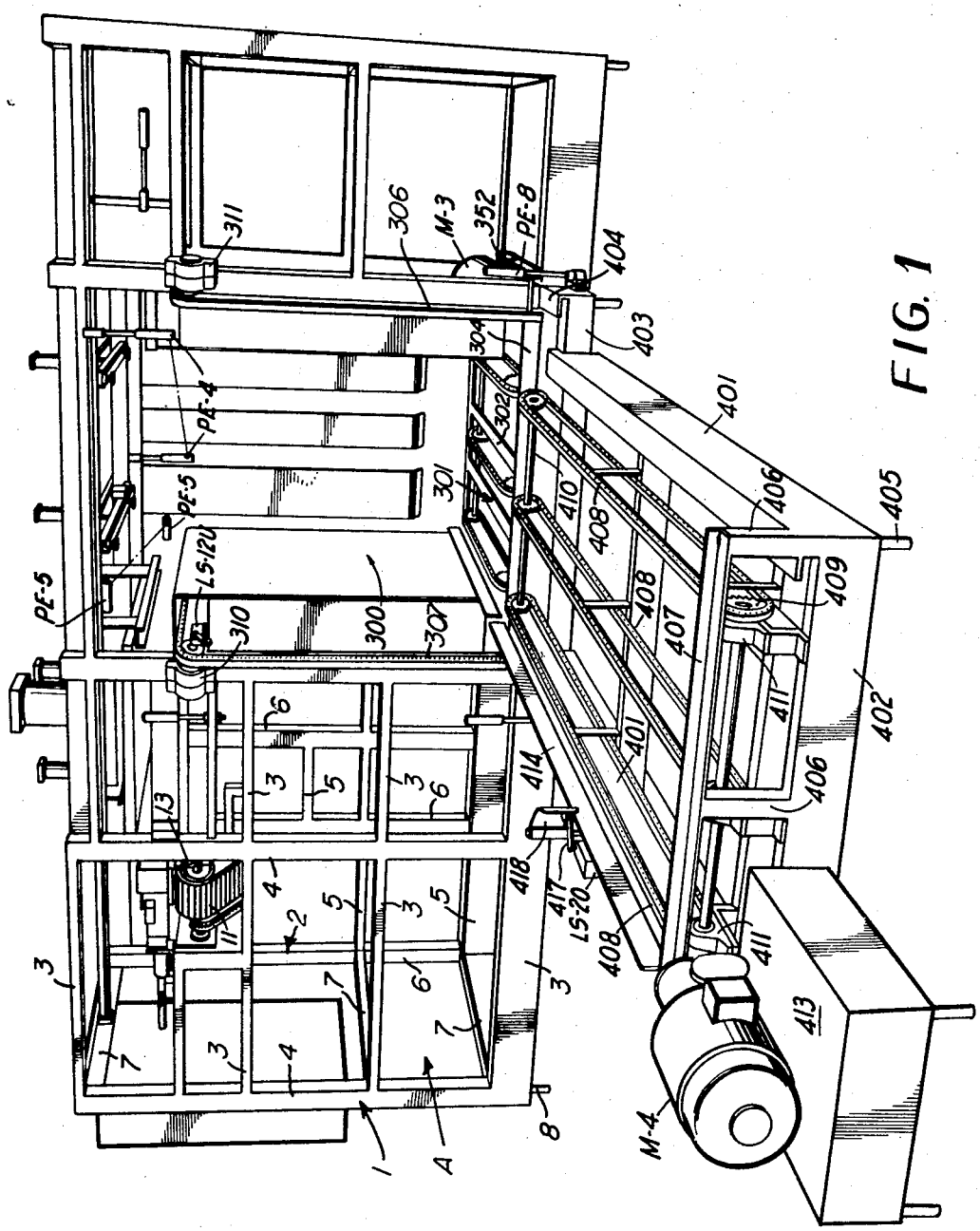

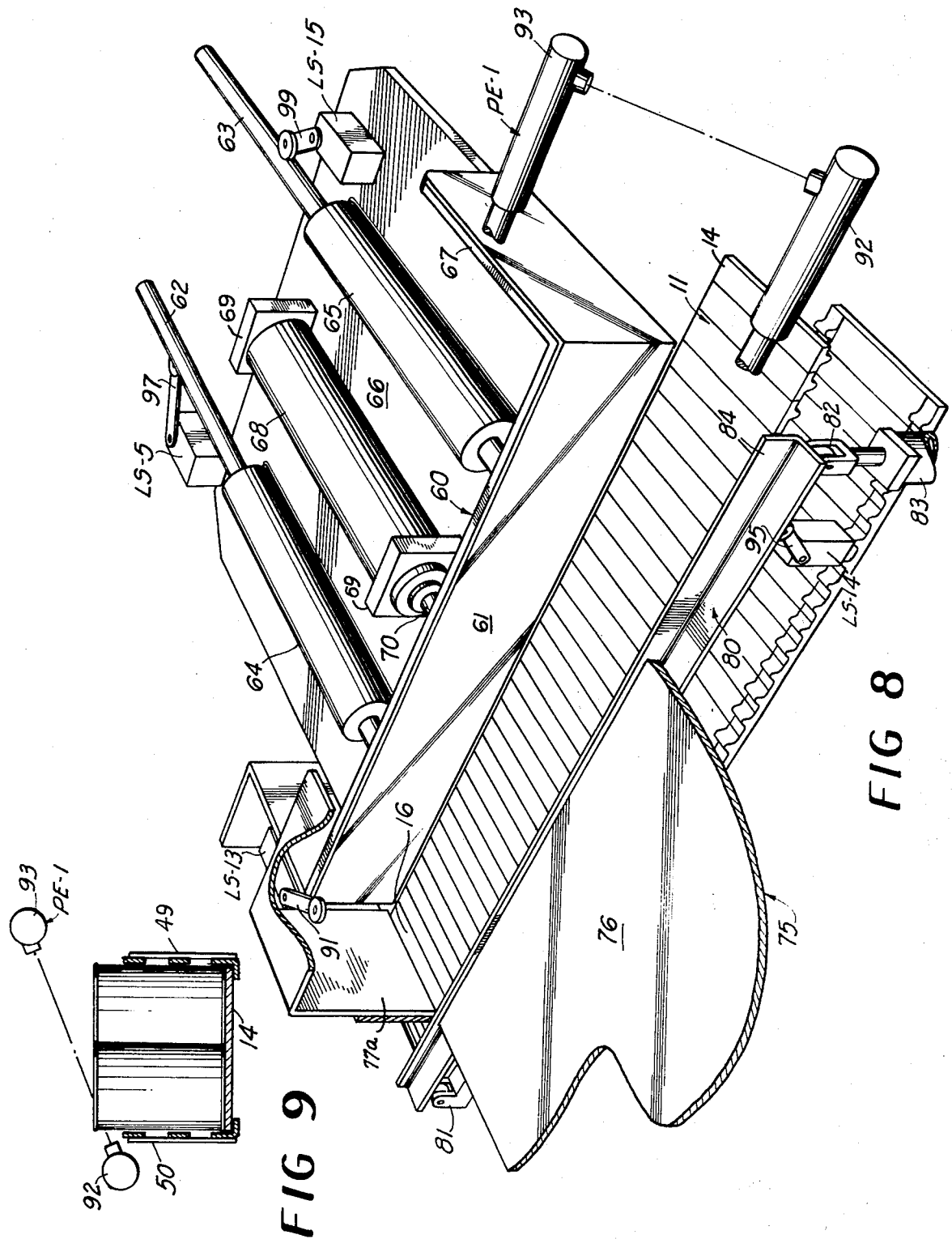

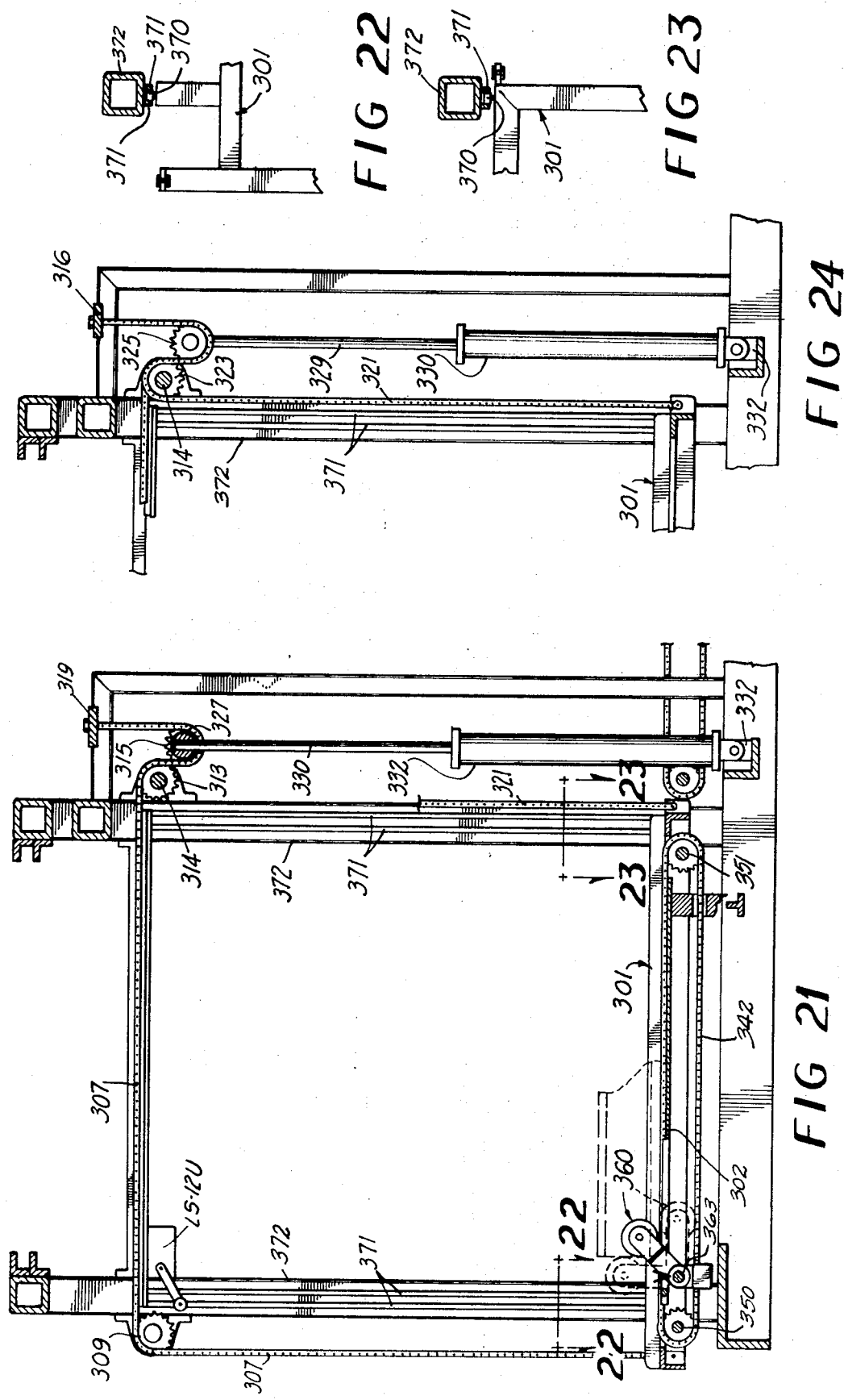

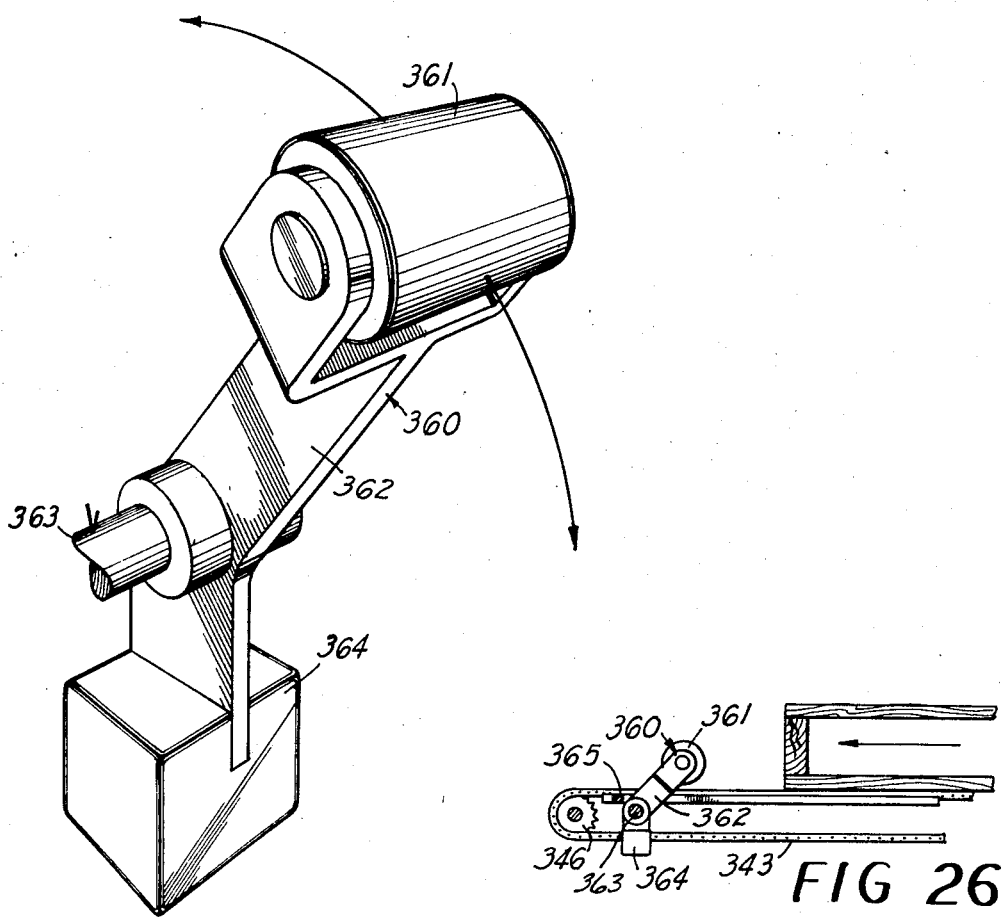
FIG 25
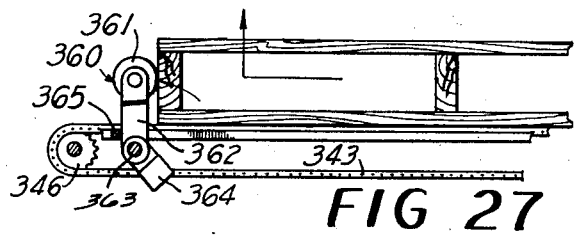
FIG 26
FIG 27
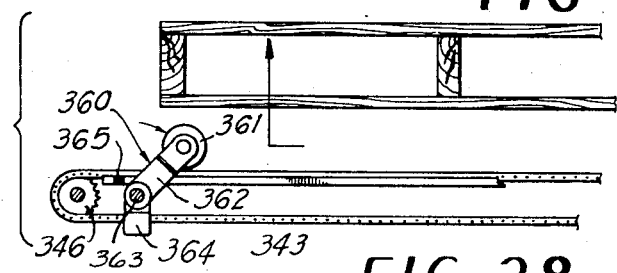
FIG 28
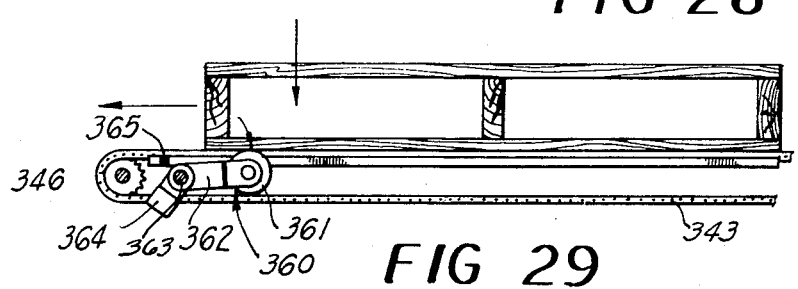
FIG 29

CAN PALLETIZER

BACKGROUND OF THE INVENTION

In handling articles, such as cans, of identical size, it is a common practice to stack such articles in layers upon pallets for ease in transporting and in storing the same. The stacking of articles on pallets, that is palletizing, may be effected by hand. However, when large quantities of articles are to be handled, such hand palletizing is very time consuming and costly. For this reason, palletizing systems and machines have been built and used. Such prior art apparatus, however, suffers from one or more deficiencies such as excessive cost, limited application, and versitility, and the like.

In order to stack articles in more than a single layer, it is often desirable to arrange the layers of articles in a predetermined pattern, which pattern is repeated for each layer whereby articles in an upper layer are positioned directly over articles in a lower layer. Prior art methods and means often involve hand labor for effecting such a pattern. Where the pattern forming has been mechanized, the machinery associated therewith is often complicated and limited in its application.

When conveying items from one place to another on a conveyor line, such as an endless belt or the like, it is a common practice to include an accumulator in the line to compensate for differences in the rate at which items are fed to and removed from the ends of the line. The prior art accumulators include large complicated revolving platforms, or the like, which require a great amount of space, are complicated in nature and require frequent maintenance.

The transfer of a layer of oriented articles from the accumulator section to a receiving pallet requires a lifter means for lifting all the articles contained in the accumulator and transferring them simultaneously to the receiving pallets. Many of the prior art devices utilize a vacuum system consisting of a suction cup for each individual article. Such vacuum transfer systems for individual articles were complicated in nature and difficult in their control.

In order to stack articles in more than a single layer it is desirable to place a slip-sheet layer separator between the layer of articles. In many of the prior art palletizers, the slip-sheets were manually placed on the layers of cans as they are stacked. The use of manual labor to position the layer separator slip-sheets defeats the whole purpose of automatic palletizing equipment.

In order to make an article palletizing system completely automatic, it is necessary to provide a pallet storage magazine for successively feeding pallets to the palletizing stations as they are required. Nurerous attempts have been made to construct pallet magazines with means for dispensing pallets individually as they are required by the pallet receiving station. Most of the prior art devices for dispensing pallets were complicated in nature and unreliable in their operation.

SUMMARY OF THE INVENTION

It is therefore a primary object of this invention to provide an automatic palletizing system which is simple in construction, economical to manufacture and reliable in operation.

A further object of this invention is to provide an article orienting means for orienting a single row of infed articles into two rows of articles wherein the articles are in longitudinally staggerd relationship relative to each other.

Another object of this invention is to provide an article accumulator section which is capable of arranging a group of articles into a predetermined area and in a predetermined pattern.

A still further object of this invention is to provide a control means for an article accumulator system which automatically effects operation thereof.

Another object of this invention is to provide a control means for sensing a selected article being located at a predetermined location on a conveyor means.

An additional object of this invention is to provide a group transfer assembly for transferring successive groups of oriented articles to a receiving pallet.

A further object of this invention is to provide a permanent magnet pick-up head for lifting and transferring a group of articles.

Still another object of this invention is to provide a stablizing means for atablizing a group of articles immediately prior to being placed in a magnetic field.

A further object of this invention is to provide an automatic transfer mechanism for transferring a separator slip-sheet successively to the tops of a group of oriented articles as they are stacked on a receiving pallet.

A still further object of this invention is to provide a pallet magazine dispenser which is capable of dispensing individual pallets to a pallet loading station as they are required.

A further object of this invention is to provide a pallet retaining means for use in a pallet magazine.

A still further object of this invention is to provide a power controlled translating stop element.

An additional object of this invention is to provide an automatic pallet conveyor and elevator system.

Another object of this invention is to provide an automatic controlled pallet stop means for use in a pallet handling system.

Still another object of this invention is to provide an automatic control system for a palletizer which effects in automatic sequence, accumulation of infed articles into a predetermined pattern, transferring the layer of articles to a receiving pallet, transferring a slip-sheet layer separator to the top of a layer of articles stacked on a pallet, senses improper operation of related mechanisms and halts the operation of the palletizer in response to receiving a signal indicating a failure in any portion thereof.

These and other objects and advantages will become apparent in the details of construction after reading the following description of one illustrative embodiment, with reference to the accompanying drawings wherein like reference characters have been used to refer to like parts throughout the several figures of drawings.

BRIEF DESCRIPTION OF THE FIGURES OF DRAWINGS

FIG. 1 is a right front perspective view of the palletizer showing the articles infeed and accumulator section on the left, the slip sheet separator bin disposed on the right, a pallet loading station disposed therebetween and a loaded pallet conveyor means extended forward therefrom.

FIG. 8 is an enlarged fragmentary perspective view of the infeed conveyor and push over mechanism.

FIG. 9 is an enlarged vertical sectional view taken substantially along lines 9—9 of FIG. 16.

FIG. 21 is an enlarged vertical sectional view taken longitudinally through the pallet loading section substantially along lines 21—21 of FIG. 3, with certain parts added thereto for purposes of clarity.

FIG. 22 is a fragmentary sectional view taken along lines 22—22 of FIG. 21, with certain parts being omitted for purposes of clarity.

FIG. 23 is a sectional view similar to FIG. 22, taken along lines 23—23 of FIG. 21.

FIG. 24 is a fragmentary vertical sectional view taken along lines 24—24 of FIG. 20, with certain parts omitted for purposes of clarity.

FIG. 25 is an enlarged perspective view of the pallet stop roller.

FIGS. 26, a vertical schematic illustration of a pallet approaching the pallet stop.

FIG. 27 is a view similar to FIG. 26 showing the roller in a stop-limit position.

FIG. 28 is a view similar to FIG. 26 showing a pallet as it moves away from the stop roller.

FIG. 29 is a view similar to FIG. 26 showing a pallet after it has been lowered onto the stop roller and pallet conveyor.

Figure 30:
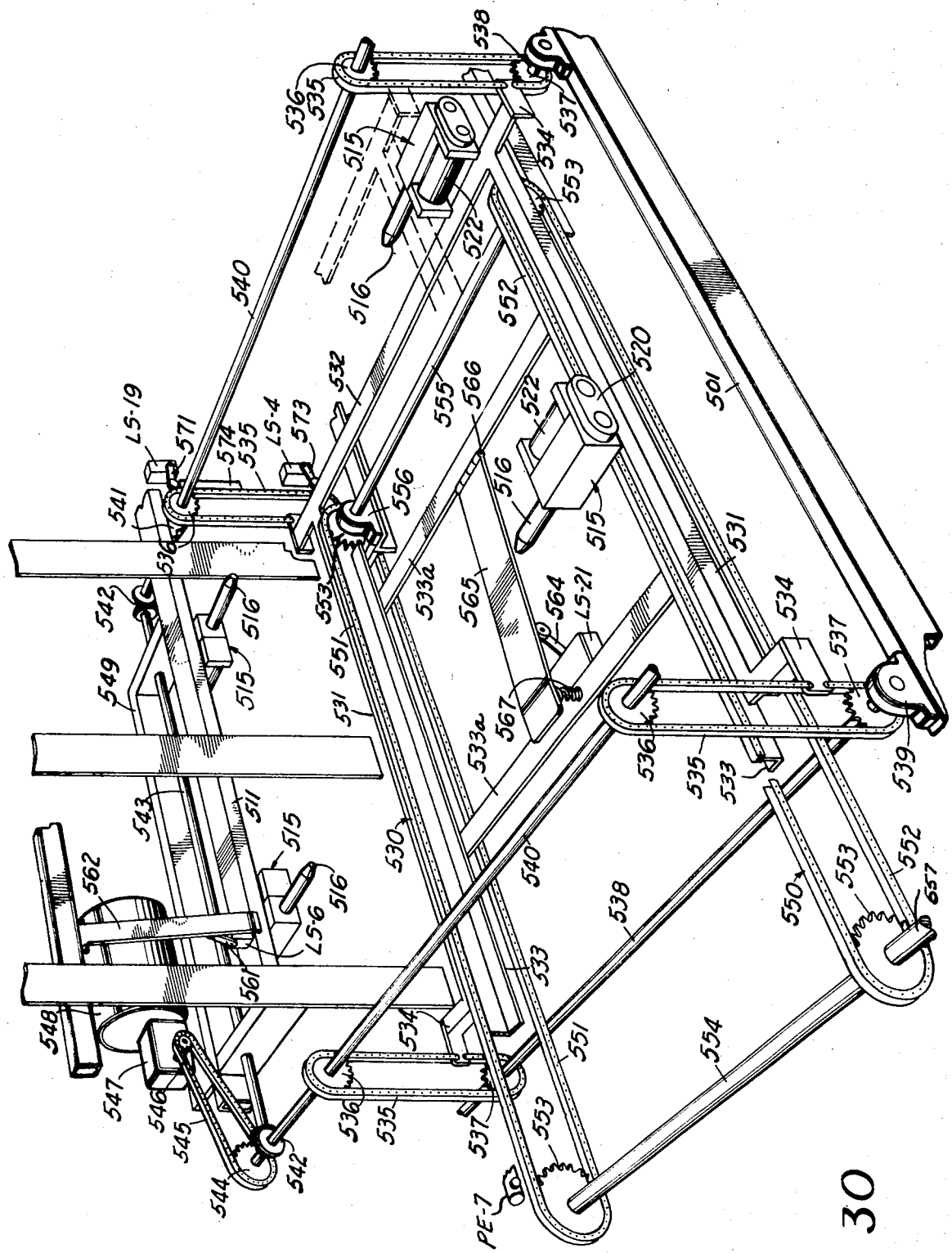

FIG. 30 is an enlarged fragmentary perspective view of the pallet magazine with certain parts omitted for purposes of clarity.

Figure 3:
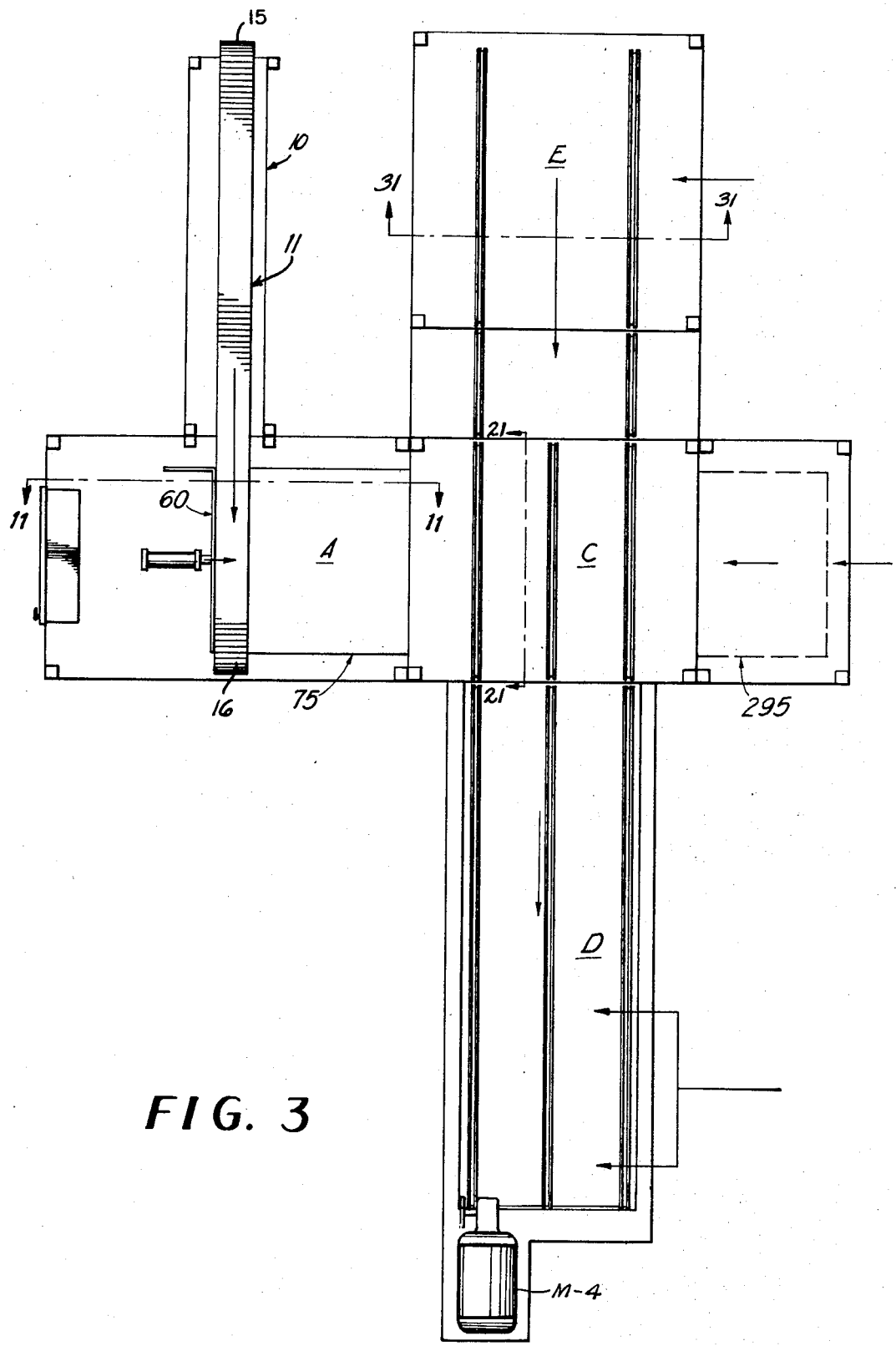
FIG. 3 is a top schematic of the palletizer showing the relationship of the can infeed and accumulator section, the pallet loading section, the pallet magazine, the slip sheet storage bin, and the loaded pallet outfeed conveyor.
Figure 31:
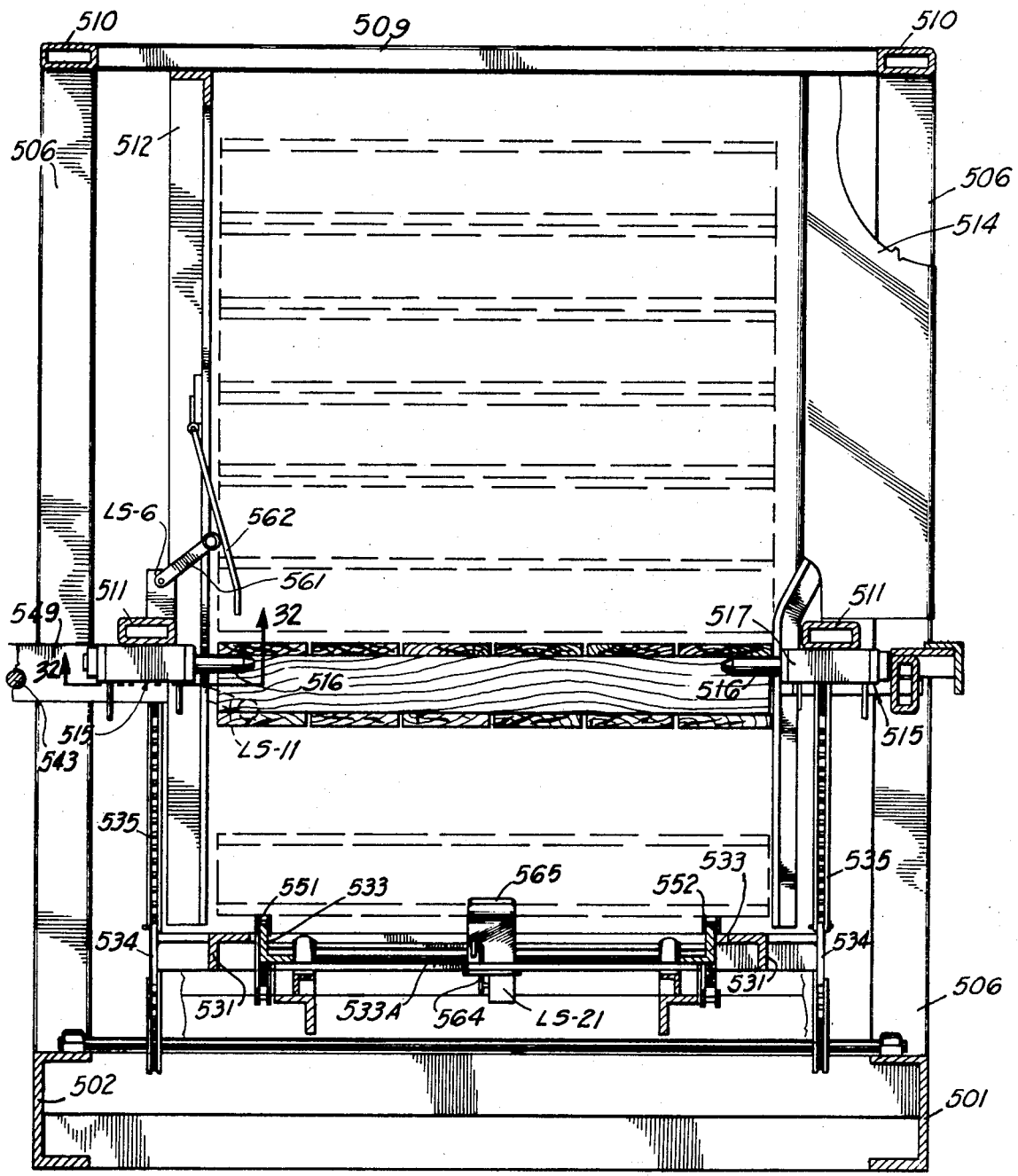

FIG. 31 is an enlarged vertical sectional view taken transversely through the pallet magazine section substantially as seen along lines 31—31 of FIG. 3, with certain parts omitted for purposes of clarity.

Figure 32:
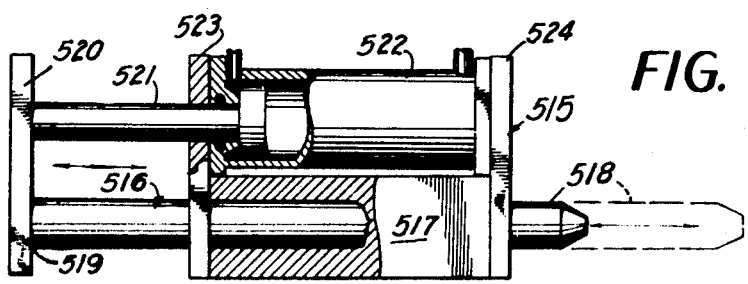

FIG. 32 is an enlarged sectional view taken along lines 32—32 of FIG. 31 with certain parts omitted and certain parts broken away and shown in sections.

Figure 33:
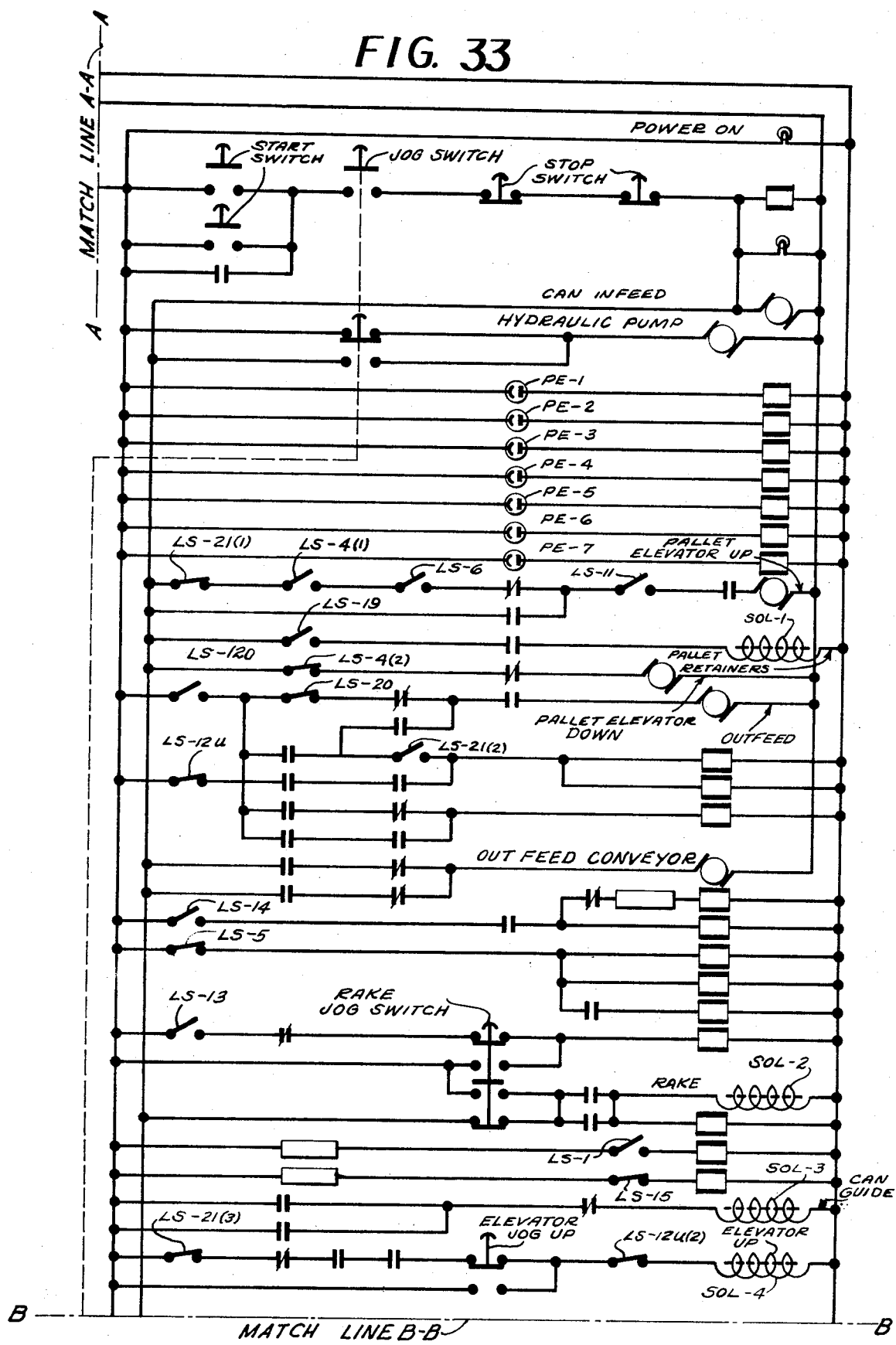
Figure 33A:
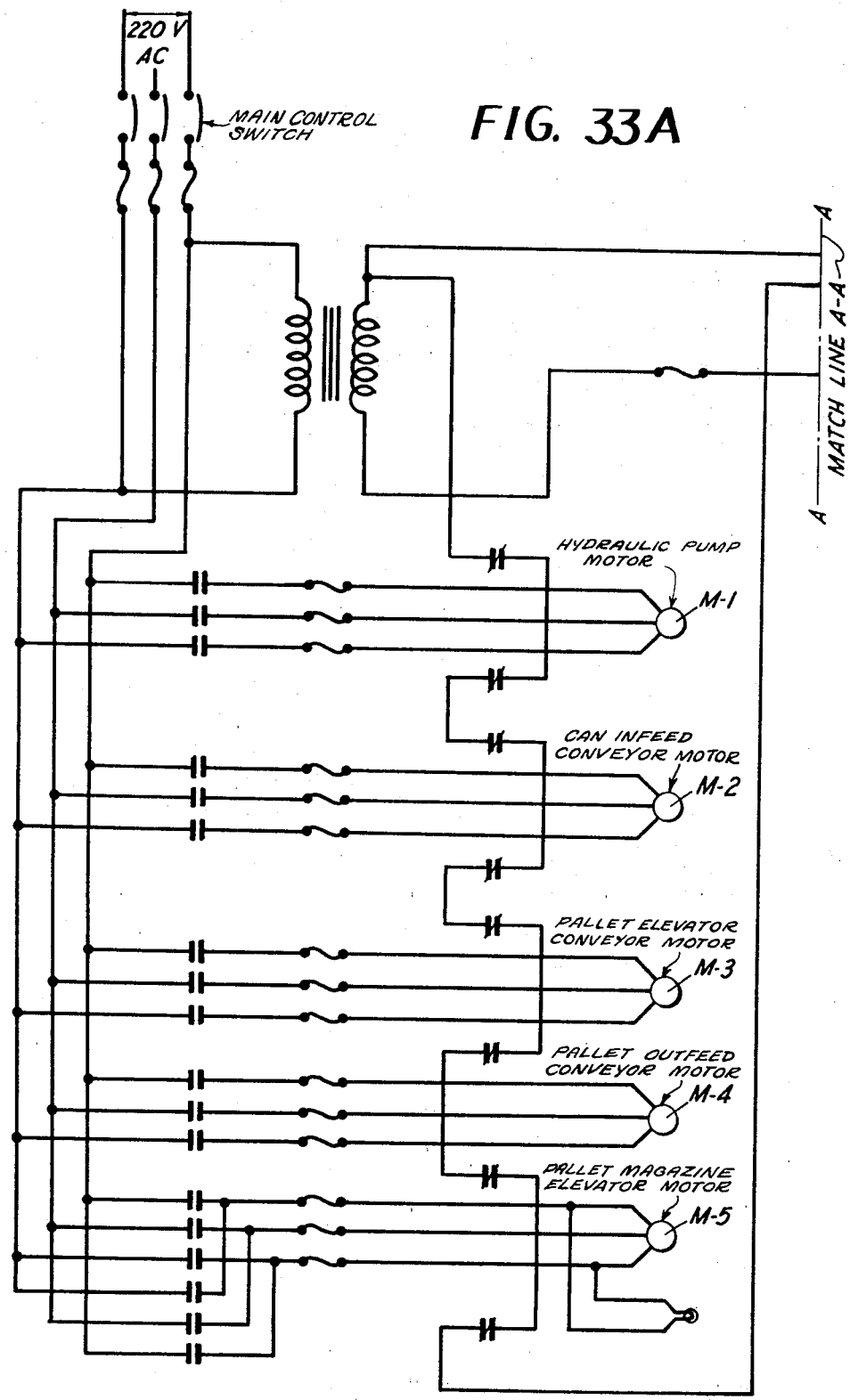
Figure 33B:
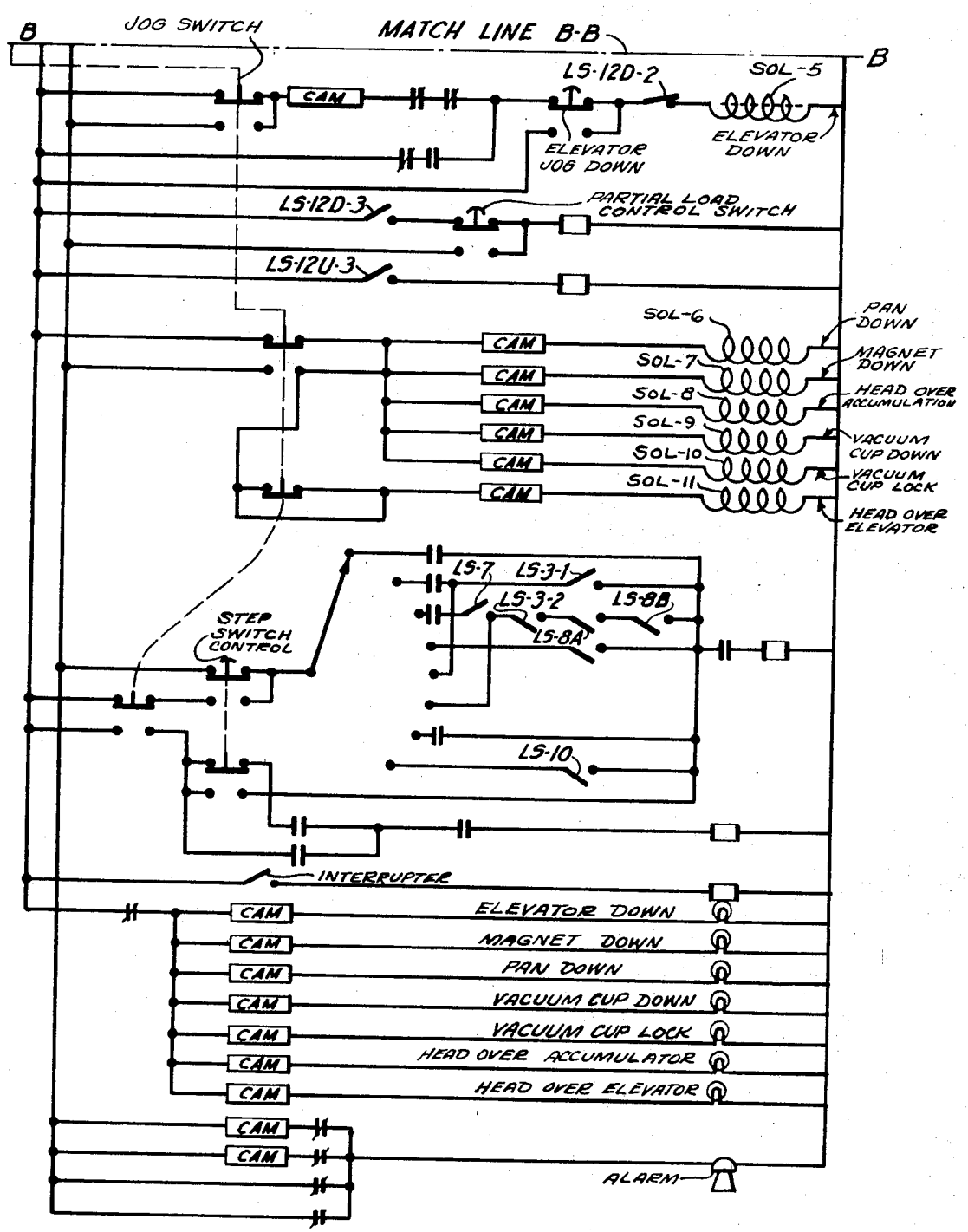

FIG. 33, 33A and 33B are electrical schematic diagrams of the control circuit.

DESCRIPTION OF THE ILLUSTRATIVE EMBODIMENT

GENERAL DESCRIPTION

Figure 2:
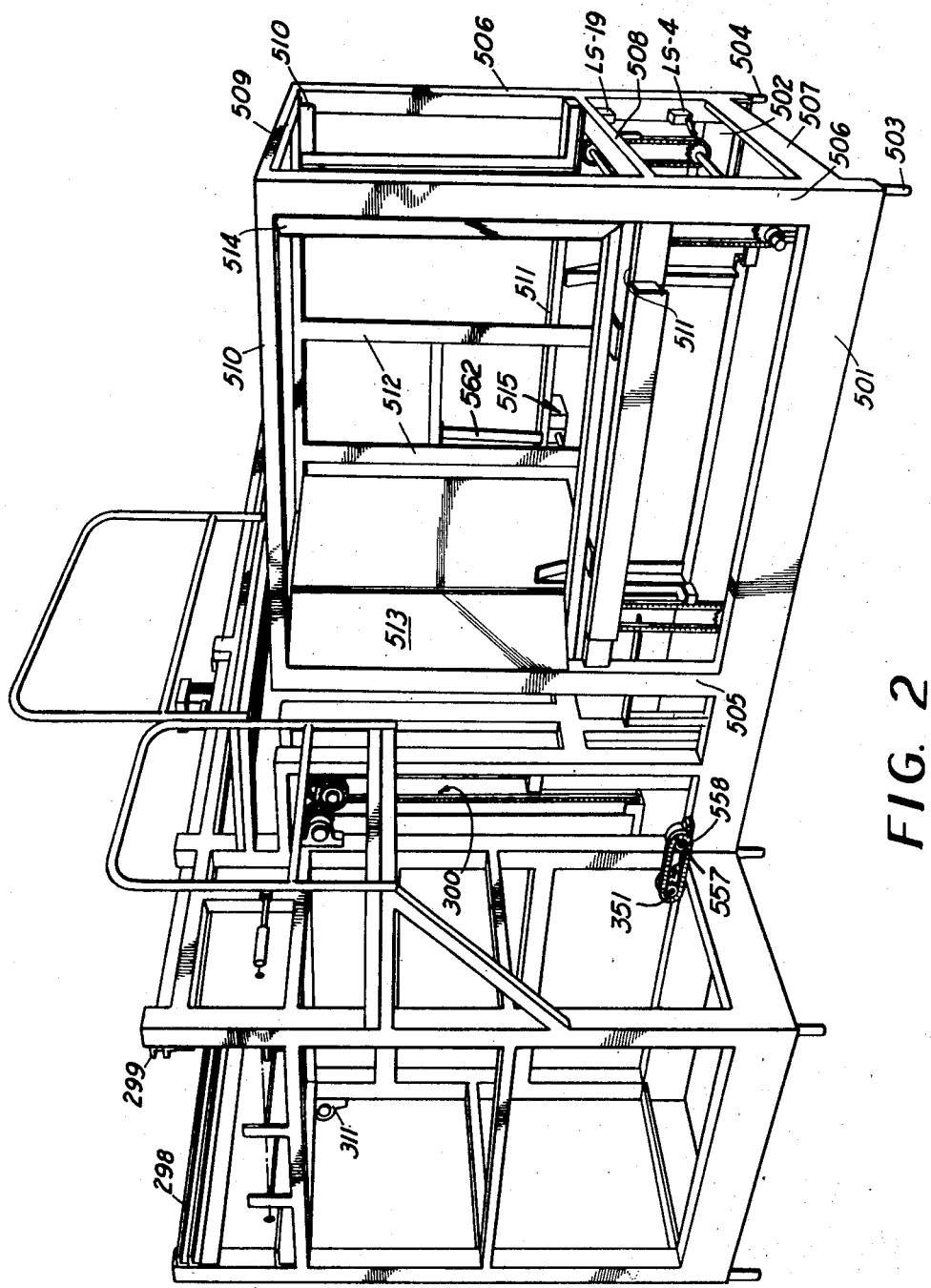
FIG. 2 is a perspective view as seen from the left rear of the palletizer showing the pallet magazine.
Figure 4:
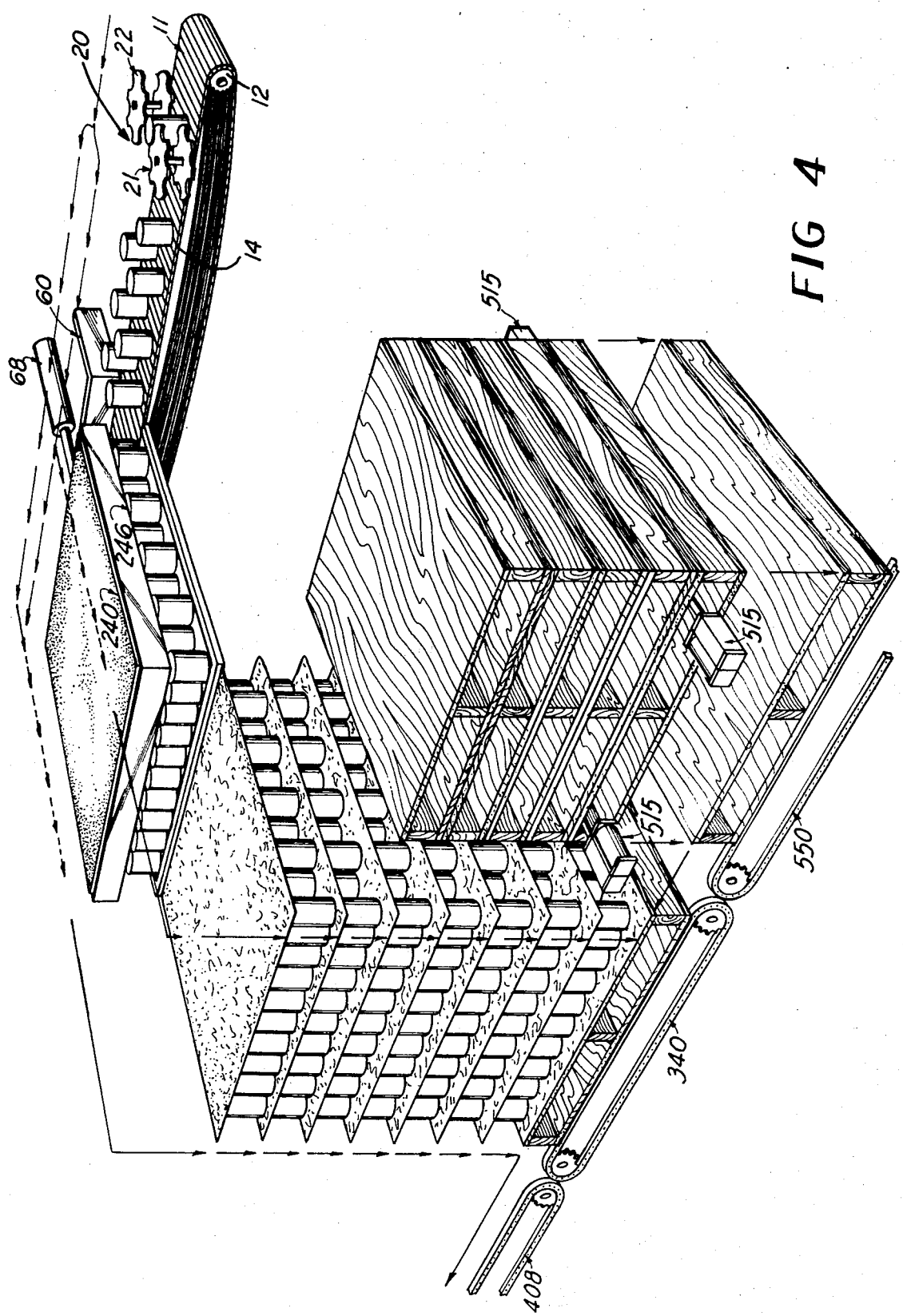
FIG. 4 is a perspective schematic illustration of the flow of the cans along the infeed conveyor to the accumulator tray and thereafter to the pallet.

The general outline of the can palletizer of the present invention is generally in FIG. 4. The can palletizer mechanism of the present invention will be described with reference to a can infeed and accumulator section A, a can layer and slip-sheet transfer section B, a pallet loading section C, a loaded pallet transfer section D and a pallet magazine section E. The can infeed and accumulator section includes an infeed conveyor and accumulator as shown in FIGS. 4–9, and 16–19. The can layer and slip-sheet transfer section include a movable carriage having mounted thereon a layer-can transfer head and a slip-sheet transfer head as shown in FIGS. 10–15. The pallet loading section is located between the slip-sheet storage bin and the accumulator section and beneath the movable carriage transfer means. The pallet loading section includes a pallet elevator assembly as shown in FIGS. 20 – 29. The loaded pallet transfer section as shown in FIG. 1 and includes an endless conveyor mechanism for effecting movement of a loaded pallet from the pallet loading section to an outfeed end thereof. The pallet magazine section is located adjacent the pallet loading section and on an opposite side of the pallet loading section as the loaded pallet transfer conveyor means as shown in FIGS. 2 and 3. The pallet magazine includes a pallet storage bin and pallet dispenser means as shown in FIGS. 30–32.

CAN INFEED AND ACCUMULATOR SECTION

The function of the can infeed and accumulator section is to receive and convey a series of cans successively to an accumulator mechanism and to group the series of successive fed cans into a predetermined pattern in a predetermined area.

As shown in FIG. 1 and 3, the can infeed and accumulator section A is located on the palletizer framework to the left of and adjacent to the pallet loading section C. The support framework for the can infeed and accumulator section includes forward support framework 1 and a rear support framework 2 (FIG. 1). The forward support framework 1 includes a series of horizontally oriented members 3 and a series of vertically extending members 4. The rear support framework 2 includes a series of horizontally oriented members 5 and a series of vertically extending members 6. Forward support framework 1 is connected to the rear support framework 2 in fore and aft spaced relationship by a series of cross connecting members 7. The can infeed and accumulator section framework is supported in vertically spaced relationship by a series of adjustable support post 8 (only one of which is shown in FIG. 1. Post 8 is adjustably connected by conventional means (not shown) to the framework 1, 2, etc.

Referring now particularly to FIGS. 3–9, 11 and 16–19 of the drawing, the can infeed and accumulator section will be described with reference to a can feeding and orienting means 10, 20; a oriented can pushover means 60; a can accumulator tray 75; and the control means 90, 91, etc. for effecting operation thereof.

Figure 5:
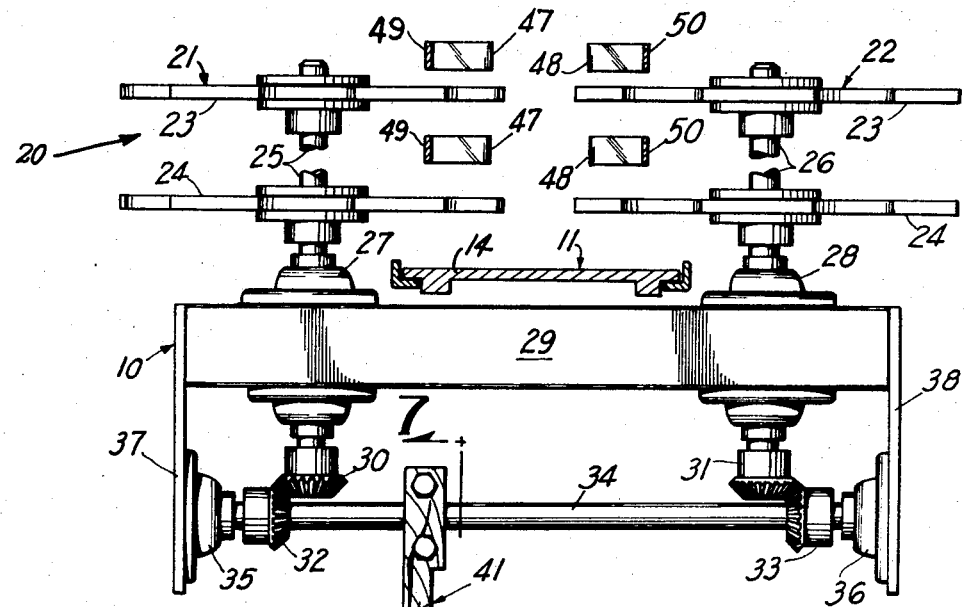
FIG. 5 is a vertical sectional view taken traversely through the can feed conveyor, adjacent the can orienting member, as seen in a direction opposite the conveying movement and with certain parts omitted for purpose of clarity.
Figure 6:
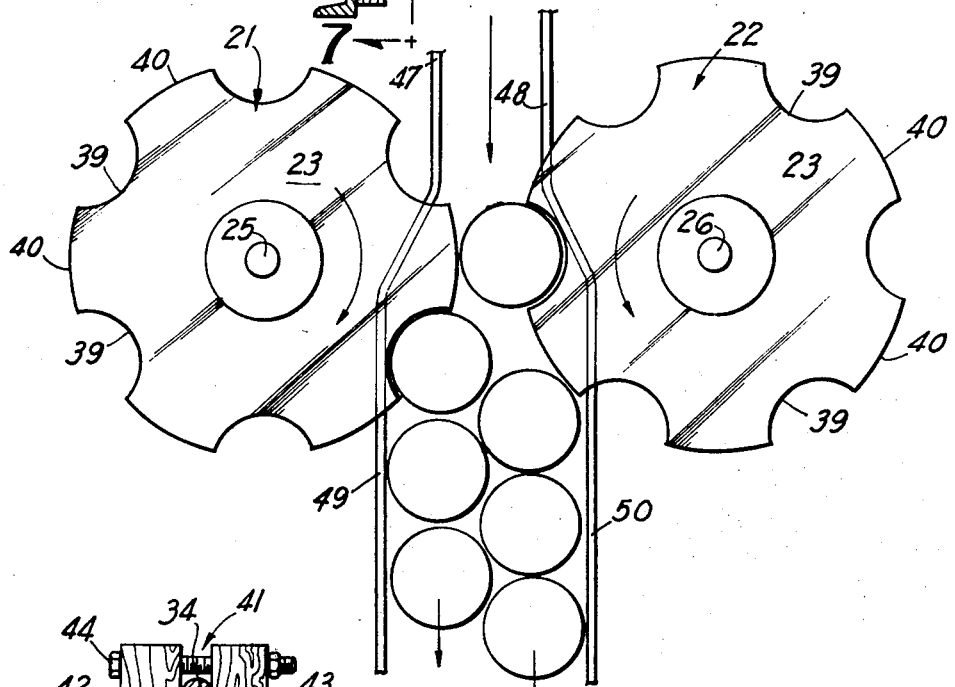
FIG. 6 is a top plan view of FIG. 5 showing the can orienting mechanism and the can guide means associated therewith.
Figure 11:
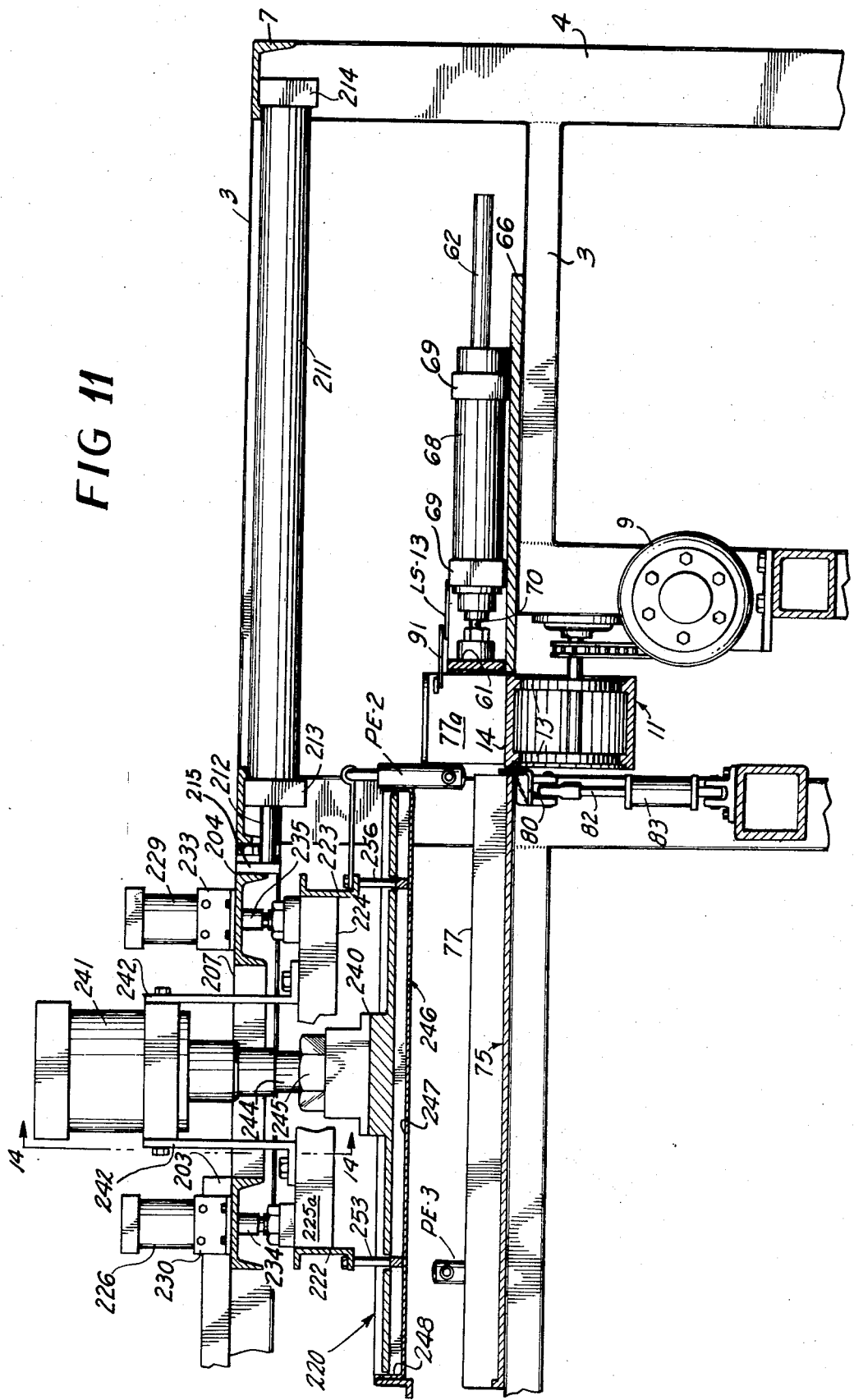
FIG. 11 is an enlarged vertical sectional view taken substantially along lines 11—11 of the schematic view of FIG. 3, with certain parts added thereto for purpose of clarity FIG. 10.

As shown in FIGS. 4, 8, and 11, the can feeding means 10 includes an endless feeding conveyor 11 supported on the palletizer framework by conventional roller support means 12, 13, and driven by conventional power motor means 9 (FIG. 11). The endless feeding conveyor 11 includes an upper run 14 supported in substantially horizontal relationship for conveying cans to be palletized from an infeed end 15 to an out feed end 16 (FIG. 3). Located adjacent the upper run 14 and between the in feed end 15 and outfeed end 16 end of endless conveyor 11 is a can orienting means 20. As shown in FIGS. 5 and 6, the can orienting means includes a pair of rotatable starwheel mechanisms 21, 22, with one of the starwheel mechanisms located adjacent each side of the conveyor 11. Each of the rotatable starwheel mechanisms includes a pair of disc elements 23, 24 connected to shafts 25, 26, in vertically spaced relationship. The shafts 25, 26, are supported in vertically oriented parallel relationship by a pair of bearing supports 27, 28 which are supported by a cross frame member 29. The lower extending ends of shafts 25, 26, have fixed thereto a pair of bevel gears 30, 31, respectfully. Bevel gears 30, 31, are immeshed with a pair of bevel gears 32, 33, which are fixed to a shaft 34. Shaft 34 is rotatably supported by a pair of bearing supports 35, 36, which are mounted on depending frame support brackets 37, 38.

Referring now to FIG. 6, each of the discs 23, 24, includes a series of radially recessed, notched can receiving portions 39, each of which is separated by a radially extending can camming portion 40. The discs 23, 24, are detailed in supporting relationship in such a manner that the discs 23, 24, of starwheel mechanism 21 are substantially coplanar with the discs 23, 24 of starwheel mechanism 22, respectfully. The disc 23, 24, of the spaced starwheel mechanisms are rotatably fixed relative to each other, by bevel gears 30, 31, etc. and shaft 34, in such a manner that the can receiving portion 39 of the disc on mechanism 21 are located directly opposite a can camming portion 40 on the disc of mechanism 22, substantially as shown in FIG. 6.

A can moving along upper run 14 of the endless conveyor 11 will contact a can receiving portion 39 and a can camming portion 40 to cause the disc 23, 24, to rotate and as the disc 23, 24, rotate, the can camming portion 40 will move a can laterally into the can receiving portion 39 of the opposite disc. A continued rotation of the disc will cause the can camming portion 40 of the opposite disc to move a can laterally in an opposite direction from the preceding can. The above described can orienting mechanism will effect an orientation of a single row of infed cans into a double row of outfed cans with the cans in the double rows being longitudinally staggered relative to each other, as shown in FIG. 6.

Figure 7:
FIG. 7 is a vertical sectional view taken along lines 7—7 of FIG. 5, with certain parts omitted for purposes of clarity.

To insure proper can orientation after the first can has been positioned, the rotatable starwheel mechanisms 21, 22, is controlled by a pony brake means 41 (FIGS. 5, 7). The pony brake 41 includes a pair of brake members 42, 43 adjustably clamped to the shaft 34 by means of a pair of threaded adjustment members 44, 45. One of the brake members 42 includes an extended end which is pivotally connected to a frame support 46. The brake members 42, 43 are adjusted to permit rotation of shaft 34 but to prevent "-free wheeling" of the discs 23, 24. This adjustment is detailed to keep at least one can in the orienting mechanisms at all times.

Movement of a single row of cans along the infeed conveyor portion 15 is controlled by a pair of laterally spaced guide rails 47, 48, and movement of two oriented rows of cans is controlled along an out feed portion 16 of the conveyor by means of a pair of laterally spaced guide rails 49, 50.

Referring now particularly to FIG. 8, located at the ends of guide rails 49, 50, and adjacent one lateral side edge of the outfeed end of conveyor 11, IS a can pushover mechanism 60 and located directly opposite the can pushover mechanism on an opposite side edge of conveyor 11 is a can accumulator tray 75. As shown in FIG. 8, the can pushover mechanism 60 includes an elongated push bar 61. The push bar 61 is supported for lateral reciprocating movement across the upper run 14 of the conveyor 11 by means of a pair of guide rods 62, 63. The guide rods 62, 63, are connected to the back of push bar 61 in coplanar parallel relationship by conventional means (not shown) and are supported for sliding movement within a pair of sleeve supports 64, 65, respectively. Sleeves 64, 65, are mounted on a support plate 66 which is supported on the palletizer frame members 2, 3, etc. Connected to an end of push bar 61 adjacent the can guide rails 49, 50, is a can stop member 67. The stop member 67 extends rearwardly from push bar 61 at approximately right angles thereto and is detailed in length to extend across the path of conveyor 11 to clock movement of cans thereon while the push bar 61 is cycled through a can pushing operation. Movement of the push bar 61 through a can pushing operation is effected by a power controlled cylinder 68 which includes a conventional push rod 70 having an extended end connected to the back of push bar 61. Cylinder 68 is supported on plate 66 by a pair of cylinder support brackets 69. The cycle of operation of cylinder 68 will be described herein below.

Figure 16:
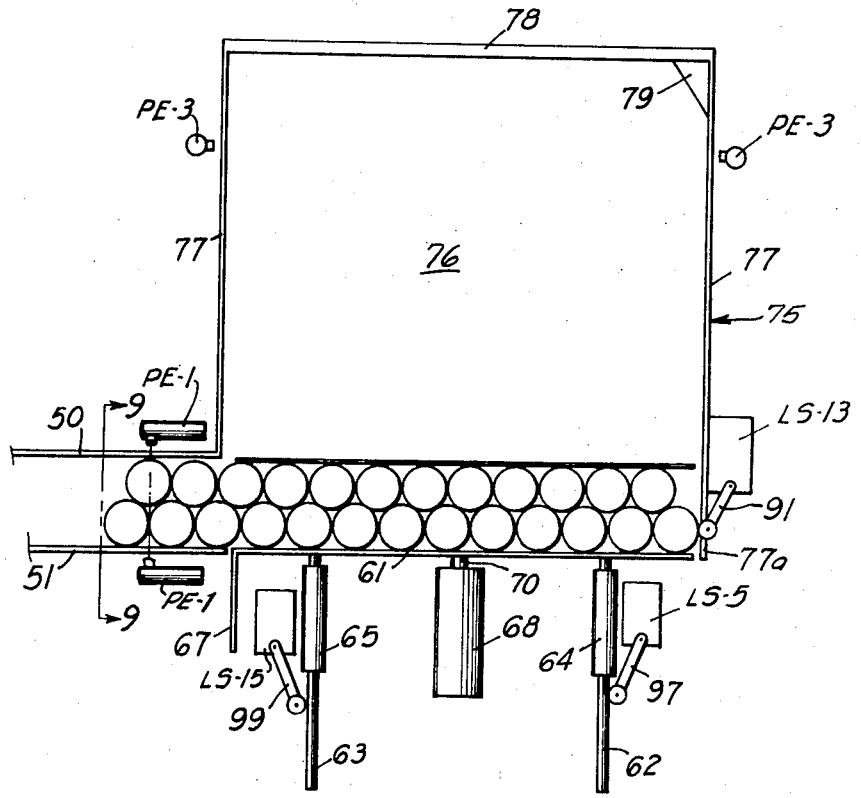
FIG. 16 is a top schematic illustration of the infeed conveyor pushover mechanism and accumulator tray showing the pushover mechanism just prior to its initial cycle of operation.
Figure 17:
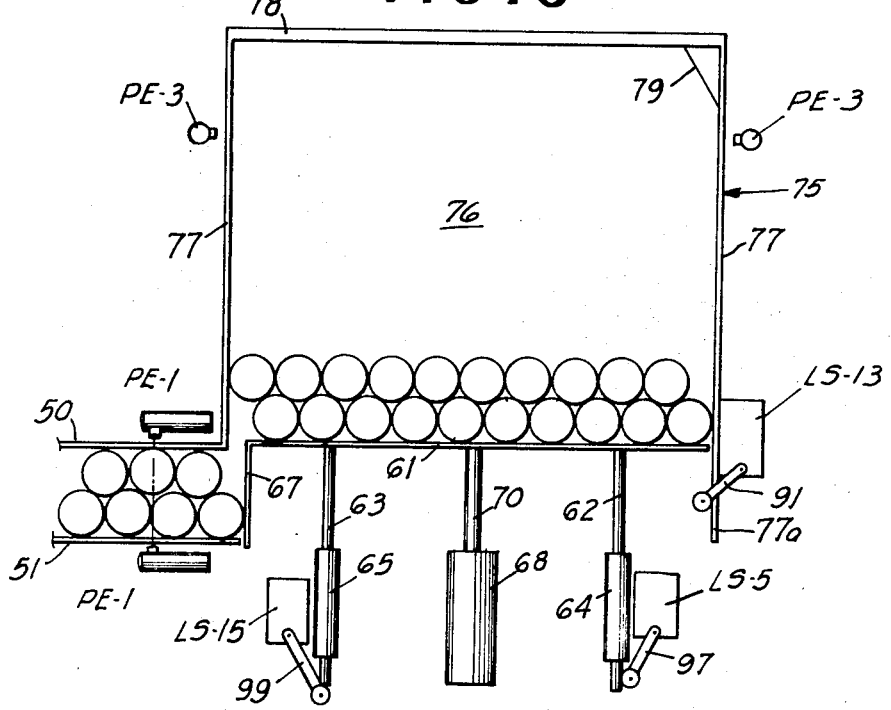
FIG. 17 is a schematic view similar to FIG. 16 showing the pushover mechanism extended through a first predetermined amount.

As shown in FIGS. 16-19, the can accumulator tray 75 includes a base plate 76 supported on the palletizer frame by conventional means (not shown) in such a manner that the plate 76 is slightly below and parallel with the upper run 14 of conveyor 11. The upper surface of plate 76 is detailed relative to conveyor 11 to allow cans on the conveyor to slide smoothly from the conveyor onto the palte 76. Located on opposite side edges of base plate 76 are two side guide rails 77. Connected to side rails 77 adjacent an opposite end of push bar 61 is an end closing member 78. As shown in FIGS. 16 and 17, an angular disposed abutment guide 79 is connected between side rail 77 and end member 79 adjacent the connecting point of rail 77 and member 79 to insure a proper location of the lead can in the first row of oriented cans.

Referring again to FIG. 8, a moveable gate 80 is disposed between the upper run 14 of the endless conveyor and the accumulator plate 76. Gate 80 is pivotally supported at 81 for movement between an upwardly extended position and a lower retracted position. Movement of gate 80 between the upper and lower position is effected by means of a power control cylinder 83 which is connected between a portion of the palletizer frame (not shown) and an end 82 of gate 80 opposite pivotal connection 81. The gate 80 includes a vertically oriented portion which is detailed to serve, while in the upwardly extended position, as a side guide rail for maintaining oriednted cans on the conveyor 11 and to provide a smooth transfer surface between conveyor 11 and plate 76 while in the lower retracted position. As shown in FIGS. 16-19, the side rail 77 adjacent the out feed end 16 of the conveyor 11 includes an extended end portion 77a which extends across the top run 14 of the conveyor to serve as a block for cans moving on the conveyor to allow cans to be accumulated thereon.

To provide for a cycle of operation of the can push over bar 61 by means of the power control cylinder 68, a series of control means is provided. A limit sensing switch LS-13 including a switch control arm 91 is supported adjacent the side rail end portion 77a. As shown in FIGS. 8 and 16, the switch arm 91 is detailed in location to be actuated by the first can located against the push bar 61, the purpose of this switch is to insure a proper orientation of the cans. If for some reason, the first can located against the rail end portion 77a was also located against the moveable gate 80, the switch control arm 91 would not be contacted and therefore a cycle of operation of the push bar would not be initiated. A photocell sensing means PE-1 is located adjacent the guide rails 49, 50, for sensing the location of a full compliment of oriented cans in the path of the push bar 61. The photocell means includes a light sensitive switch 92 and a switch light source 93. The location of the light sensitive switch 92 and light source 93 are detailed in location (FIG. 9) such that the light from light source 93 will only contact the top edges of cans located against the rail 50 and in the row of cans adjacent the moveable gate 80. Since the orienting mechanism does not position the cans against the guide rail 50, they must contact guide end portion 77a and back up before they will be pressed against the guide rails. As seen in FIG. 16, when the cans have backed up to a point that they are pressed against rail 50, a can located in the path of the light beam from light source 93 will block the light beam causing actuation of PE-1. PE-1 includes a tie delay control in which relay operation of the switch can be adjusted to occur from 1 to 5 seconds after the photocell is darkened and a premature actuation of switch 92 can-not occur since cans moving along with the conveyor will not block the light beam a sufficient time for actuation of the switch 93, since moving cans are not pressed against the side rail 50 as stated above.

As shown in FIG. 11, a limit sensing switch LS-14, including a switch control arm 95, is located beneath the moveable gate 80. The location of the switch LS-14 is detailed such that switch LS-14 will be actuated by the control arm 95 when the gate 80 is moved to a retracted position by cylinder 83. Located on plate 66 adjacent guide rod 62 is a limit sensing switch LS-5 for sensing the extent of lateral movement of the push bar 61. Switch LS-5 includes a control arm 97 detailed for contacting the guide rod 62 to be operated thereby after the guide rod 62 has moved a first predetermined amount. Also, located on plate 66 adjacent guide rod 63 is a limit sensing switch LS-15 for sensing the amount of lateral movement of push bar 61. Switch LS-15 includes a control arm 99 for contacting the guide rod 63 to be operated thereby after guide rod 63 has moved a second predetermined amount.

Referring to FIGS. 11 and 16-19, a photoelectric cell PE-3 is supported adjacent the two side rails 77 for sensing the fourth cycle of can push over operation to thereby cause the pushover cylinder 68 to be extended through the above mentioned second predetermined amount. Movement of the pushover bar 61 through the second predetermined amount on the fifth cycle of operation will cause the cans to be pressed slightly against the end rail 78 for alignment beneath the can transfer mechanism.

The operational sequence of the above described controls and their relationship with other palletizer mechanisms will be described below in the operation of the palletizer.

CAN LAYER AND SLIP-SHEET TRANSFER ASSEMBLY

The function of the can layer and slip-sheet transfer assembly B is to effect a transfer of accumulated cans from the accumulator to a pallet in successive order to form a series of layers of cans on the pallet. The function of the slip-sheet transfer assembly is to effect a transfer of a layer separator slip-sheet from a bin containing slip-sheets to the tops of a layer of cans that have been deposited on the pallet to thereby provide a series of layers of cans separated by slip-sheets.

Figure 10:
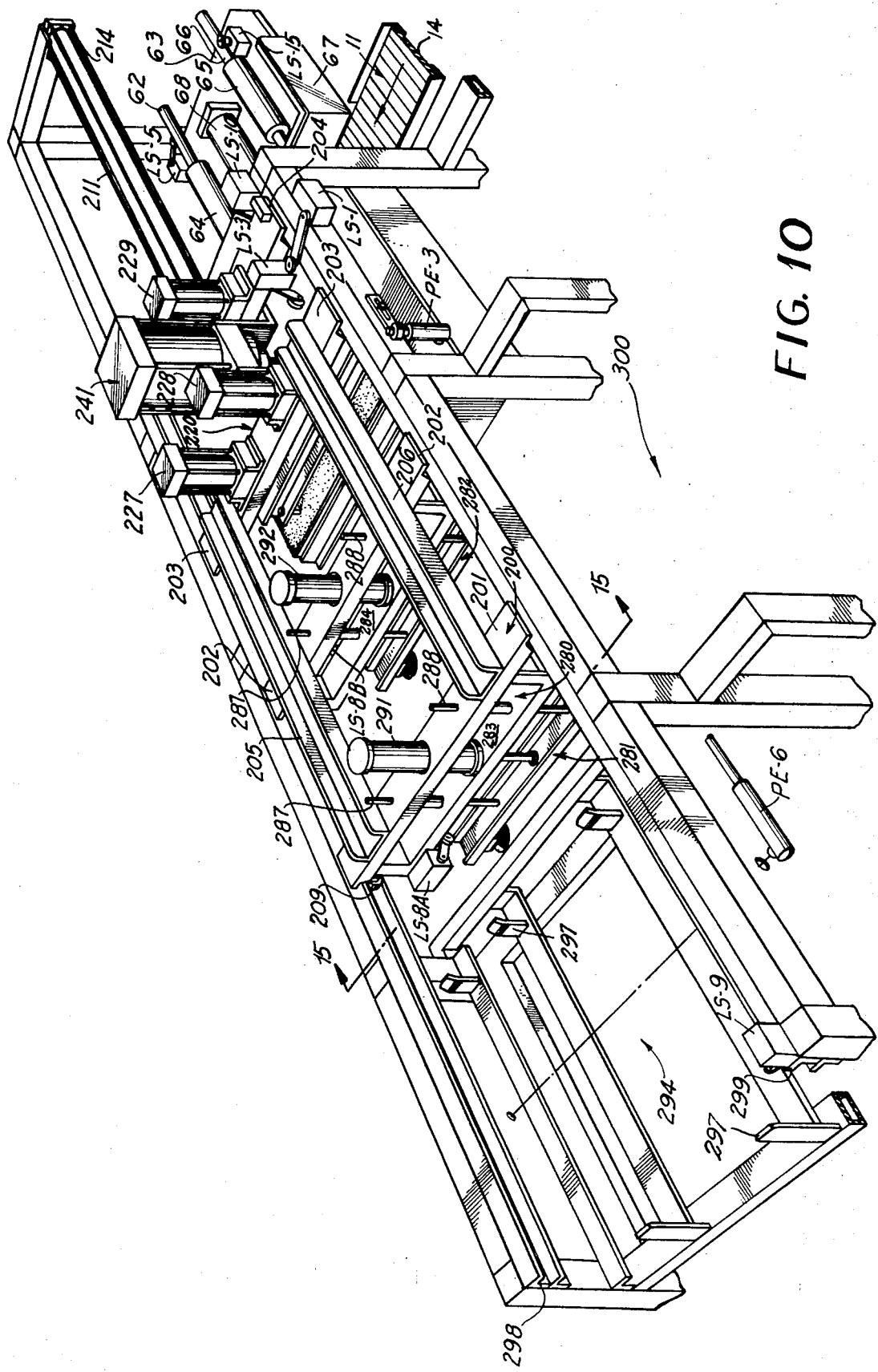
FIG. 10 is an enlarged fragmentary perspective view showing the can and slip-sheet transfer assembly, with certain parts omitted for purposes of clarity.
Figure 12:
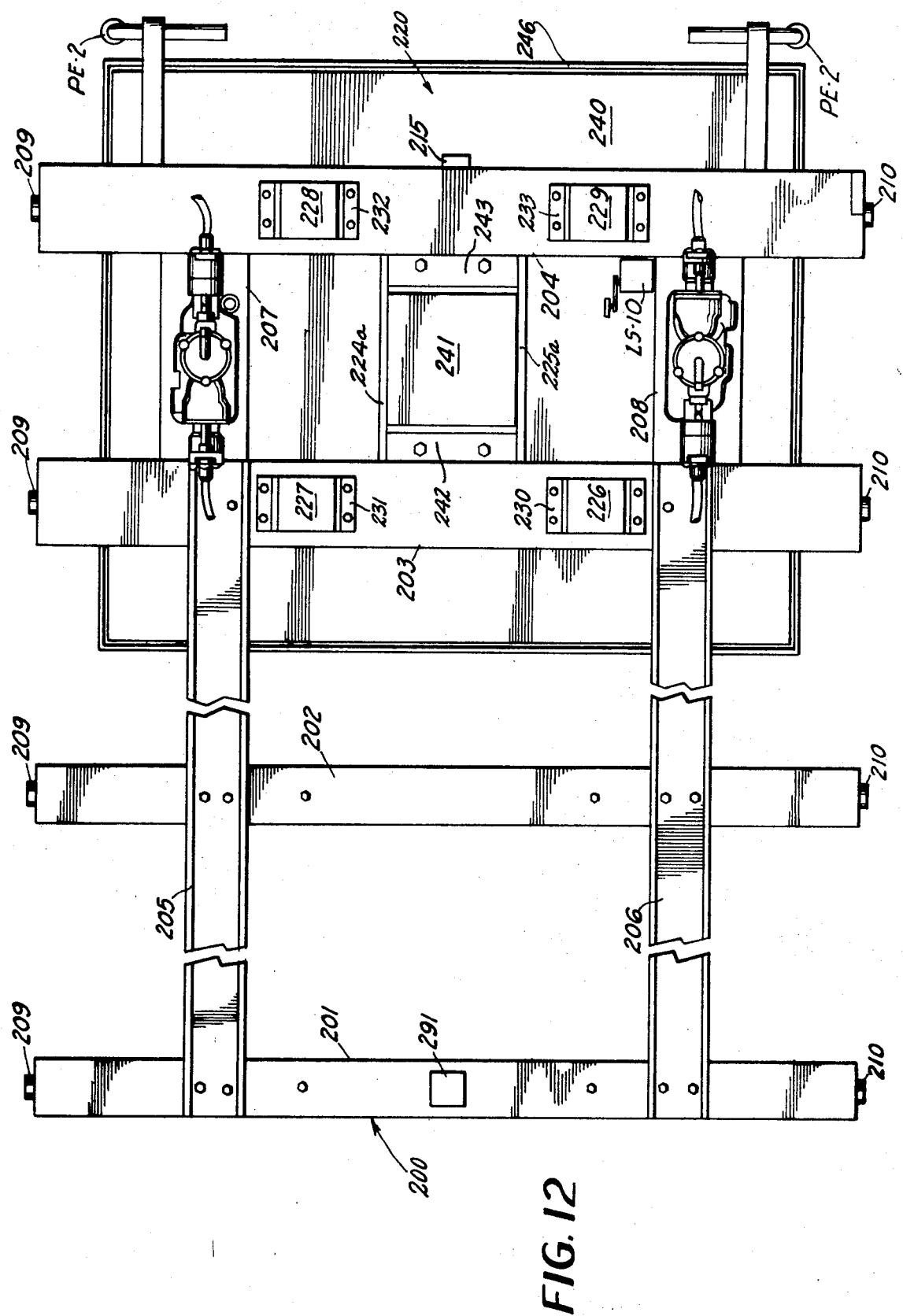
FIG. 12 is an enlarged top plan view of moveable carriage support means.

Referring to FIGS. 10-15 of the drawing, the can layer and slip-sheet transfer assembly will be described with reference to a support carriage 200, a can layer transfer mechanism 220, and a slip-sheet transfer mechanism 280. As shown in FIGS. 10 and 12, the support carriage 200 includes a series of spaced runner support members 201, 202, 203, 204. The runners 201-204, are connected together to form a unitary carriage by means of a series of cross connecting beams 205, 206, 207, and 208. The beams 205, 206, are detailed to overlay and connect runners 201, 202, and 203 in parallel spaced relationship. The beams 207, 208, are detailed to fit between runners 203 and 204 in substantially coplanar relationship with the runners 203, 204. The beams 205–208 are connected to the runners 201–204 by conventional means such as welding, to provide a unitary carriage consisting of sour runners and four cross support beams. Supported on one extended end of each of the runners 201–204 is a roller support 209. Supported on an opposite end of each of the runners 201–204 is a second roller support means 210. The rollers 209 and 210 are detailed for rolling engagement within a pair of spaced horizontally supported and aligned guide channels 298, 299, which are supported adjacent the top of the palletizing framework 1, 2, etc., as shown in FIG. 10.

The above described carriage and roller support mechanism is supported on the palletizing frame for reciprocating movement within the channel guide tracks 298, 299. Reciprocating movement of the carriage is effected by a pneumatic power control cylinder 211 (FIG. 10 and 11). Cylinder 211 is supported on the palletizing frame by means of a pair of cylinder support brackets 213, 214. Cylinder 211 includes a moveable rod 212 which is connected at 215 to the carriage support runner 204. It is apparent that by energizing the cylinder 211, the carriage 200 will be moved to the left and laterally along the carriage support runners 298, 299 and by de-energizing the cylinder 211, the carriage 200 will be moved to the right as shown in FIG. 10.

Figure 14:
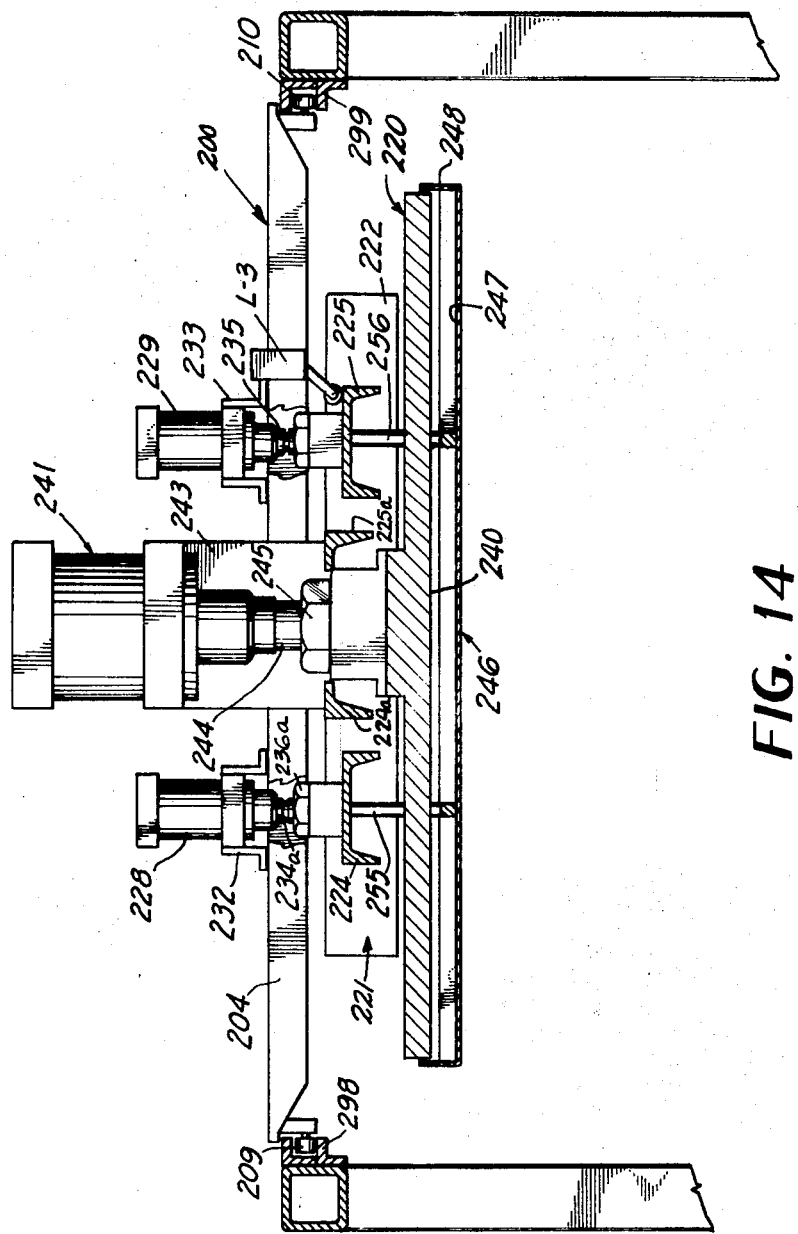
FIG. 14 is a vertical sectional view taken along lines 14—14 of FIG. 11 with certain parts omitted and certain parts broken away for purposes of clarity.

Referring particularly to FIGS. 11, 12, and 14, a can transfer mechanism 220 is mounted on the carriage 200. The can transfer mechanism includes a sub-frame 221. The sub-frame 221 consists of two fore and aft channel shaped runners 222, 223, connected together in parallel spaced relationship by means of two cross connecting members 224, 225. The two runners 222, 223, and the two cross connecting members 224, 225, are detailed to provide a substantially rectangular shaped sub-frame 221. The sub-frame 221 is supported on the carriage by means of four pneumatic power control cylinders 226, 227, 228, and 229. Each of the cylinders 226-229 is mounted on the carriage 200 by a series of cylinder support Brackets 230, 231, 232, and 233, respectively. Each of the cylinders 226–229 includes a piston rod (only three of which are shown in FIGS. 11 and 14) as 234, 234a and 235. The piston rods 234, 234a 235, are connected to the sub-frame 221 by adjustable connecting means 236, 236a and 237. Supported on the sub-frame 221 is a permanent magnet pick-up head 240. The magnetic pick-up head is supported on the subframe 221 for vertical translating movement by means of a power control cylinder 241. The cylinder 241 is supported on the sub-frame 221 by means of a pair of L-shaped support brackets 242, 243. Support brackets 242, 243 are connected to sub-frame cross members 224a, 225a. Thus, it is apparent that the cylinder 241 is held in a fixed position relative to the subframe 221. The cylinder 241 includes a conventional reciprocating piston rod 244 which has its extended end connected to the magnetic pick-up head 240 by means of an adjustable connecting means 245. Also supported on the sub-frame 221 is a can stabilizing pan 246. Pan 246 includes a bottom portion 247 having a peripheral upturned flange portion 248.

Figure 13:
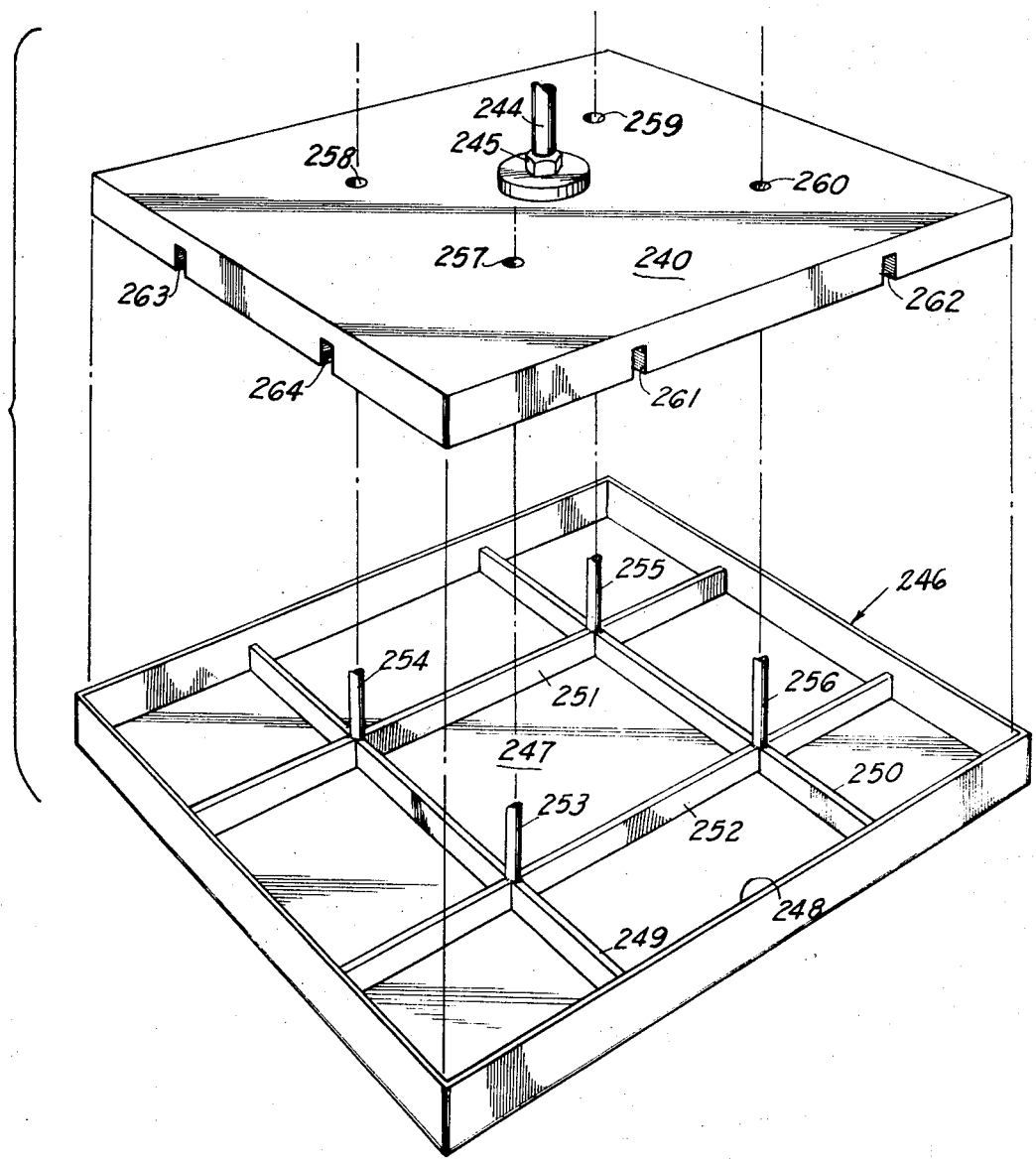
FIG. 13 is an enlarged exploded perspective view of the magnetic pick-up head and stabilizing pan.

As shown in FIG. 13, the stabilizing pan bottom 247 includes a pair of laterally spaced parallel arranged fore and aft reinforcing elements 249, 250. The stabilizing pan bottom 247 also includes a pair of spaced parallel arranged laterally extended reinforcing elements 251, 252. The fore and aft reinforcing elements and lateral reinforcing elements intersect each other to provide four juncture points. Connected to the stabilizing pan 246 at each of the reinforcing element juncture points are four vertically extending post elements 253, 254, 255, 256. The posts 253–256 are detailed to extend through complimentary openings 257,258,259,and 260 formed in the magnetic pick-up head 240. The extended end of each of the posts 253–256 are connected to the under side of sub-frame support members 222, 223, to hold the stabilizing pan 246 in a fixed spaced relationship relative to the subframe 221, as shown in FIGS. 11 and 14.

Referring now, again, to FIG. 13, the magnetic pick-up head 240 includes a pair of fore and aft extending notches 261, 262, complimentary to the fore and aft reinforcing elements 249, 250 of the stabilizing pan and a pair of laterally extending notches 263, 264, complimentary to the laterally extending reinforcing elements 251, 252.

From the above described can transfer mechanism, it is apparent that the can transfer mechanism includes a sub-frame 221 mounted on the carriage 200 for vertical translating movement by four power control cylinders 226-229 and that the sub-frame 221 includes a magnetic pick-up head 240 which is vertically moveable relative to the sub-frame by means of power control cylinder 241. The above described relationship between the subframe 221 and the magnetic pick-up head 240 provides for vertical translating movement of the magnetic pick-up head relative to a stabilizing pan 246 which is supported beneath the sub-frame 221 by means of the four vertically extending posts 253–256. Operation of the cylinder 241 is detailed to effect a movement of the magnetic pick-up head from an extended position adjacent the surface of the stabilizing pan to a retracted position displaced from the surface of the stabilizing pan. The four posts 253–256 will provide a guide means for the magnetic pick-up head relative to the stabilizing pan and the notches 261–264 of the magnetic pick-up head will allow the magnetic pick-up head to move to an extended position in full engagement with the bottom of the stabilizing pan bottom 247.

The magnetic pick-up head 240 is detailed in magnetic strength to develop a magnetic field sufficient to pick up a layer of cans arranged on the above described accumulator tray 75.

The extent of movement of the magnetic head relative to the stabilizing pan is sufficient to separate a layer of cans from the magnetic field developed by the magnetic head to allow the cans to be deposited onto a pallet and to allow the cans to be held by the pan to stabilize the layer just prior to being placed in the magnetic field.

Figure 15:
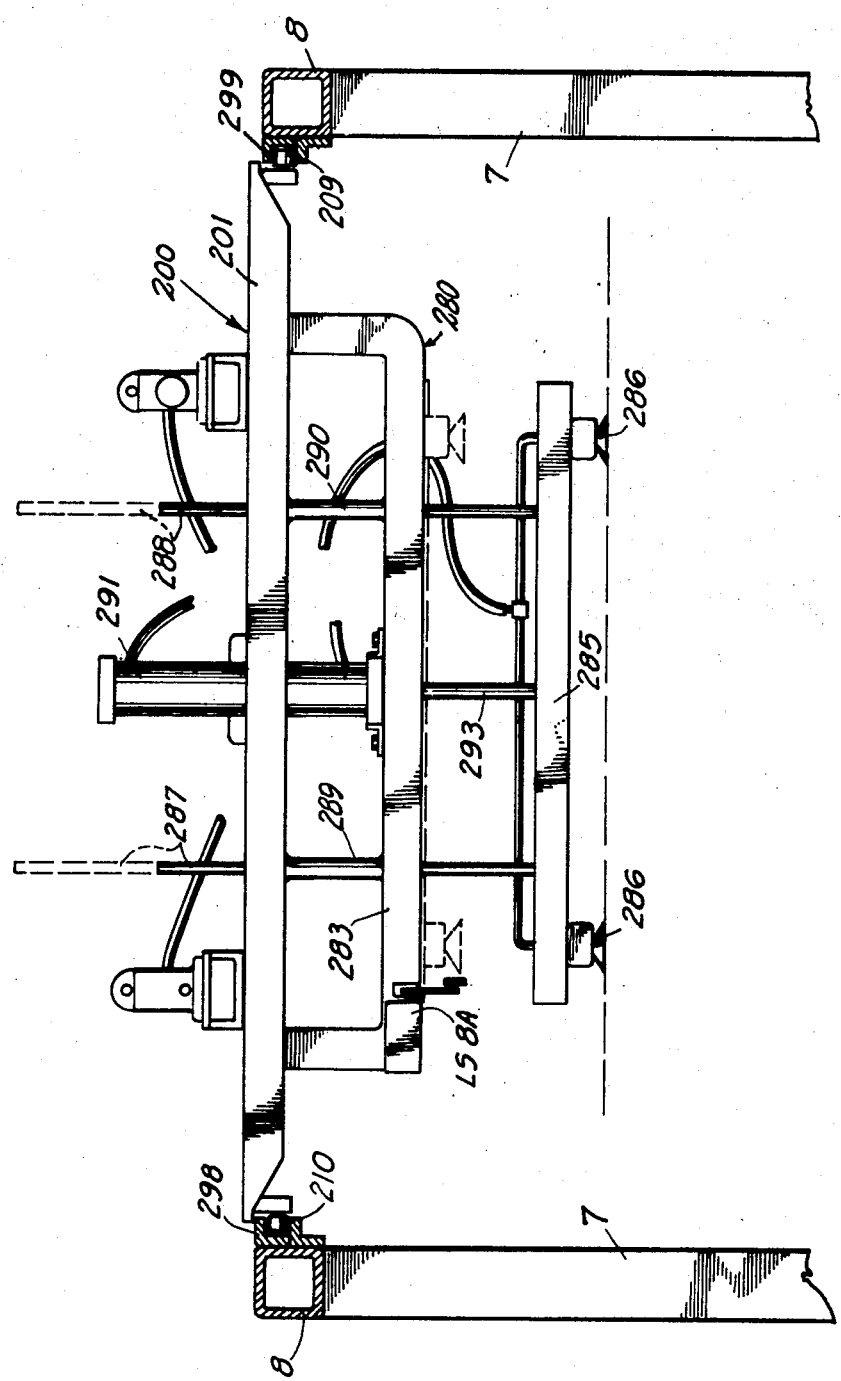
FIG. 15 is a vertical sectional view taken along lines 15—15 of FIG. 10 with certain parts omitted for purposes of clarity.

Referring now particularly to FIGS. 10 and 15, the slip-sheet transfer mechanism 280 includes a pair of vacuum pick-up heads 281,282. The vacuum pick-up heads are supported beneath the carriage 200 by a pair of inverted substantially U-shaped frame support members 283, 284. The frame support members 283, 284 are connected to the underside of runners 201, 202. Each of the pick-up heads 281, 282, is provided with a vertically moveable support plate 285 (FIG. 15). Each of the plates 285 carries a pair of suction cups 286. The support plates 285 are supported and guided for vertical translating movement by a pair of guide rods 287, 288, which are detailed to extend through a pair of sleeve elements 289, 290, mounted between the runners 201, 202, and the inverted U-shaped support members 283, 284, respectively. Vertical translating movement of the support plate 285 with suctions cups 286 is effected by means of a pair of power control cylinders 291, 292 which are supported by the runners 201, 202, and the inverted U-shaped support members 283, 284, as shown in FIG. 15. Each of the cylinders 291, 292, includes a connecting rod 293 which has its extended end connected to the suction head support plate 285. Control means for effecting operation of the cylinders 291, 292 will be described hereinbelow.

As shown in FIG. 10, a slip-sheet storage bin 294 is provided on the palletizing framework on the left end of the carriage support rails 298, 299. The support bin includes a plurality of parallel arranged and horizontally disposed slip-sheet support runners 295 which are supported in vertically spaced relationship below the runners 298, 299. Each of the support runners 295 includes upstanding slip-sheet alignment bracket 297 fixed to their opposite ends for providing aligned guide means for maintaining the slip-sheets in a vertically stacked relationship.

Control for the slip-sheet transfer assembly is provided by a series of conventional photoelectric cells and a series of conventional limit switches. The leftward extent of travel of the carriage 200 along the guide rails 298, 299 is controlled by a limit switch LS-9 located above the left end of guide rail 299 and controlled as to rightward extent of movement by a limit switch LS-10 located adjacent the right end of guide rail 299. Each of the limit switches LS-9, LS-10, includes a conventional control arm detailed to be located in the path of the carriage movement. A limit switch LS-1 is also located adjacent the right end of guide rail 299 (FIG. 10) for sensing movement of the carriage 200.

A photo cell PE-6 is located adjacent the slip-sheet storage bin (FIG. 10) for sensing the presence of a predetermined number of slip-sheets in the storage bin.

LOcated above the pallet loading elevator and adjacent the path of movement of carriage 200 (FIG. 1) is a photo cell PE-5 for sensing a slip-sheet being located on the vacuum pick-up heads 281, 282.

A pair of limit switches LS-8A and LS-8B are located on the vacuum pick-up heads 281, 282, respectively for sensing the upward limit of movement of the moveable plate 285 with suction cups 286.

As shown in FIG. 10 and 14, a limit switch LS-3 is supported on carriage runner 204 and includes a control arm for sensing the up limit position of the stabilizing pan and sub-frame support 221.

The electrical sequence of operation of the above described control elements and their relationship to the other palletizer controls will be described below in the description of the operation of the palletizer.

PALLET LOADING SECTION

The pallet loading section is located on the palletizer frame work between can accumulator section and the slip-sheet storage bin and beneath the path of travel of the can and slip-sheet transfer carriage. The function of the pallet loading section is to receive an empty pallet from the pallet magazine, elevate the empty pallet to a selected height for receiving layers of cans from the accumulator section, progressively lower the pallet with the layers of cans in increments of downward movement sufficient to position the preceding layer of cans in a position for receiving a next layer of accumulated cans thereon and after a pallet has been successively loaded to the maximum position, to thereafter convey the loaded pallet to the loaded pallet conveyor section.

Figure 20:
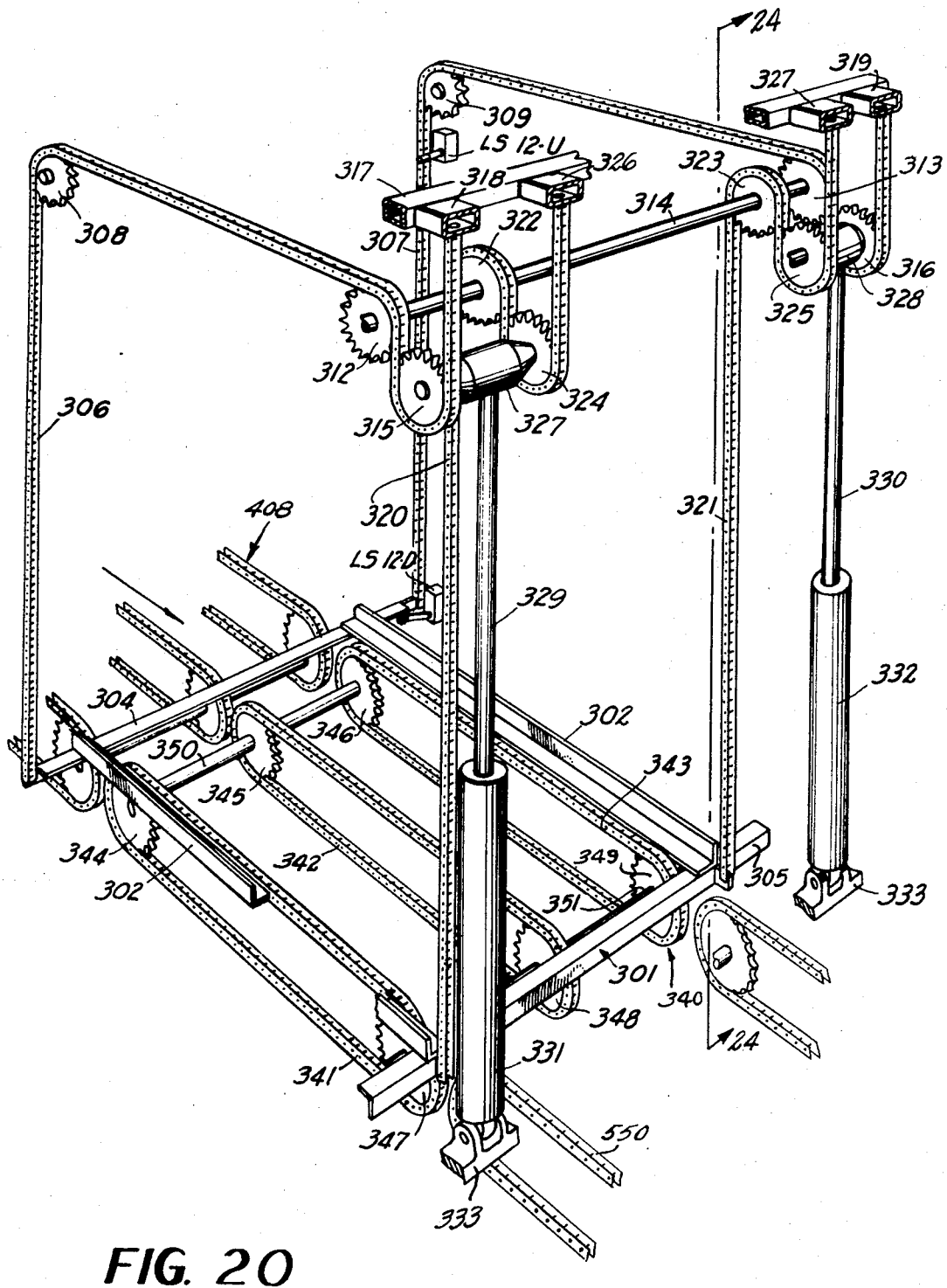
FIG. 20 is an enlarged fragmentary perspective view of the pallet loading station and elevator therefor with certain parts omitted for purposes of clarity.

Referring now particularly to FIGS. 1 and 20-29, the pallet loading section 300 (FIG. 1) includes a pallet support rack 301. The pallet support rack includes a series of pallet retaining bars 302 which are supported in parallel spaced relationship by a pair of crossed support bars 304, 305. Each of the cross support bars 304, 305 includes two oppositely directed extended end portions. Connected to the extended end portions of cross support bar 304 are a pair of flexible lift chains 306, 307. The chains 306, 307 extend vertically upward and pass over a pair of idler support sprockets 308, 309 respectively. The support sprocket 308 is supported by a support block 310, as shown in FIG. 1 and the idler support sprocket 309 is supported by a support block 311. After the flexible elevator chains 306, 307 pass over the sprockets 308, 309 they extend in a horizontal direction to the right as shown in FIG. 20 and pass over a pair of idler support sprockets 312, 313. The sprockets 312, 313 are rotatably supported by a shaft 314 which is supported on the palletizer framework by conventional means not shown. As the elevator lift chains 306, 307 leave the sprockets 312, 313 they extend down under and around a pair of movable sprockets 315, 316. After the elevator lift chains 306, 307 pass under the sprockets 315, 316 they extend vertically upward with their extended end being connected to a spaced pair of connecting brackets 318, 319 which are fixed to a cross frame member 317 of the palletizer frame.

A pair of flexible elevator chain elements 320, 321 are connected to the cross support bar 305 at a position adjacent the connection between the cross support bar 305 and the pallet retaining bars 302. The elevator lift chains 320, 321 extend vertically upward and pass over a pair of sprockets 322, 323 which are rotatably supported by the shaft 314. As the elevator lift chains 320, 321 leave the sprockets 322, 323 they extend down and around a pair of sprockets 324, 325. After the elevator lift chains 320, 321 extend around the sprocket 324, 325 the extended end thereof extends vertically upward and is connected to a pair of brackets 326, 327 which are fixed to the palletizer cross frame member 317.

The sprockets 315, 316 324 and 325 are rotatably supported by a pair of support heads 327, 328. The heads 327, 328 are fixed to the extended end of a pair of piston rods 329, 330. The piston rods 329, 330 are operatively supported for vertical translating movement by a pair of power controlled cylinders 331, 332.

Cylinders 331, 332 are fixed adjacent their lower end to a palletizer cross frame member 333. Cylinders 331, 332 are provided with conventional hydraulic control means for controlling the piston rods 329, 330 in a vertical translating movement within the cylinders. It is apparent that the above described pallet rack and elevator chain support mechanism is capable of supporting a pallet on the pallet support rack 301 and through operation of the power control cylinders 331, 332 the pallet support rack 301 may be elevated vertically upward to any one of a selected position between a lower pallet supported position as shown in FIG. 20 and an upper pallet supporting position. When a pallet is supported in the maximum upward vertical position the pallet is in a position for receiving the first layer of cans from the can transfer assembly. The pallet elevator mechanism is then operated to effect successive stepped lowering of the pallet to present the tops of a preceding layer of cans in alignment for receiving a next layer of adjacent cans from the can transfer assembly. When the pallet elevator mechanism has been moved to a lower inactive position as shown in FIG. 20 the pallets carried by the pallet rack 301 are then in a position to be engaged by a pallet conveyor mechanism for conveying a loaded pallet therefrom onto the loaded pallet removable conveyor and for conveying an empty pallet from the magazine pallet conveyor into position on the pallet rack for being elevated to a pallet loading position.

The operation of the hydraulic cylinders 331, 332 includes a conventional pressurized hydraulic power source (not shown) controlled by conventional valve means (not shown). The operation of the hydraulic valves for effecting controlled movement of the pallet elevator 306, 307, etc., includes an upper limit switch LS-12U and a lower limit switch LS-12D (FIG. 20). Each of the limit switches LS-12U and LS-12D includes conventional control arms detailed in location for sensing the upper and lower limits of movement of the pallet rack support bar 304 (FIG. 20) to stop movement of the pallet elevator in its upper and lower limit positions, respectively. The progressive stepped lowering of the pallet elevator in increments of movement is effected by a conventional photoelectric cell PE-4 (FIG. 1) which senses the upper edge of cans stacked on the pallet. When the light in PE-4 is blocked out by a layer of cans placed on the pallet, the hydraulic cylinders 331, 332 will be actuated to lower the pallet and cans until the light in PE-4 is again made, at which position the elevator is stopped in a position of alignment for receiving the next slip-sheet and layer of cans.

Referring now particularly to FIG. 20 the pallet conveyor for controlling a pallet within the pallet loading section includes a conveyor system 340. Conveyor system 340 includes three endless chain mechanisms 341, 342, 343. The endless chains 341, 342, and 343 are supported for operation by a series of sprockets 344, 345, 346, 347, 348 and 349. Sprockets 344-346 are fixed to a shaft 350 which is supported for rotation within the palletizer framework by conventional means, (not shown). Sprockets 347-349 are fixed to a shaft 351 which is also supported in the palletizer framework by conventional means not shown. Shaft 350 includes an extended end (not shown) which is connected with a drive means 352 (FIG. 1). Drive means 352 is operatively associated with a conventional power motor means M-3 for effecting operation of the endless conveyors. Operation of the motor M-3 is effected by a closing of the elevator lower limit switch LS-12D above described.

As shown in FIG. 21, the pallet rack support bars 302 are detailed in a lower limit position to be slightly lower than the upper run of the endless conveyors 341-343 whereby a pallet in this position will rest on the upper run of the endless conveyors 341-343 in such a manner that rotation of the conveyors 341-343 in a counterclockwise direction as shown in FIG. 20 will effect a transfer of a loaded pallet from the pallet loading section onto the pallet removable conveyor. While in this position, the endless conveyors 341-343 will also be in a position to receive an empty pallet from the pallet magazine conveyor.

As shown in FIGS. 21 and 25-29, the pallet loading section includes a pallet stop mechanism 360. The pallet stop mechanism 360 includes a roller 361 which is rotatably mounted on a bell-crank arm 362. Crank arm 362 is pivotally supported by a cross shaft 363 supported on a palletizer frame mechanism not shown. The oppositely extended end of the crank 362 has a counterweight 364 fixed thereto. A roller stop bracket 365 is fixed to a palletizer framework for limiting pivotal movements of the roller and crank arm in a counterclockwise direction about the support shaft 363. The pallet stop mechanism is detailed in location relative to the pallet loading elevator for contacting and limiting forward travel of an empty pallet as it is conveyed thereon. When an empty pallet contacts the roller 361 the roller and crank 362 will rotate in a counterclockwise direction about shaft 363 until the crank arm 362 contacts the stop bracket 365 which will stop the forward travel of the pallet. After the pallet has been stopped by the pallet stop mechanism 360 it will be in a proper aligned position to be elevated vertically upward for receiving layers of cans thereon. As shown in dotted lines in FIG. 21 and in FIGS. 26-29, the counterweight 364 will pivot the roller and crank arm clockwise about shaft 363 to an position located beneath a pallet on the pallet elevator mechanism. When the pallet stop mechanism has been rotated to the position as shown in FIG. 28, the lowering of a pallet will contact the upper surface of the roller 361 to cause a further clockwise rotation of the roller about support shaft 363 a sufficient amount to allow the pallet to rest on the upper run of the endless chains 341 - 343 and with the roller stop 361 in this position a loaded pallet will be free to pass over the roller 361 and onto the pallet removable conveyor. After a loaded pallet has passed over the roller stop 361 the counterweight 364 will again move the roller stop to a position as shown in FIG. 26 to position the roller for engagement with a next empty pallet as it is conveyed into the pallet loading section. The above described pallet roller stop 360 includes two identical laterally spaces roller mechanism 361, 362, etc., supported on shaft 363, however, only one has been shown and described in detail.

The sequence of operation of the above described sensing and control switches and their relationship to the other palletizer controls will be described herein below in the description of the operation of the palletizer.

As shown in FIG. 22 and 23, the pallet elevator is provided with a roller guide means adjacent each corner of the pallet rack 301. Each of the roller guide means includes a roller 370 guided by a vertically oriented channel-shaped track 371 which is mounted on a palletizer framework post 372.

LOADED PALLET TRANSFER SECTION

The loaded pallet transfer section is supported adjacent the palletizer in such a manner that the loaded pallet transfer section has a receiving end detailed in pallet receiving relationship relative to a pallet outfeed end of the pallet loading section conveyor. The function of the loaded pallet transfer section is to effect a transfer of a loaded pallet from the pallet loading section to a position remote from the pallet loading section for further handling. The loaded pallet transfer section includes a support framework consisting of a pair of fore and aft extending beams 401, which are connected together in parallel laterally spaced relationship by a series of cross connecting beams 402. The rearmost cross connecting beam as shown in FIG. 1, includes a pair of laterally extending end portions 403, only one of which is shown. The laterally extending end portions 403 are connected to the main palletizing framework by a pair of support brackets 404.

A series of vertically extending floor contacting posts are provided adjacent four corners of the support framework to support the loaded pallet transfer section in a substantially horizontal position. The foremost cross connecting beam 402, as shown in FIG. 1, includes a series of vertically extending posts 405 which have a cross connecting bar 406 mounted thereon to provide a loaded pallet abutment stop means.

Mounted on the support framework 401, 402, etc. is a conveyor mechanism which consists of three laterally spaced endless chains 408. The endless chains 408 are supported in a horizontally disposed relationship by means of a series of sprockets 409. The sprockets 409 are fixed to shafts 410. Shafts 410 are rotatably supported by conventional bearing blocks 411. A drive for effecting rotation of the endless chains 408 is provided by a conventional power motor means M4 which is mounted on a motor support 413. The driving connection between the power motor means M4 and the endless conveyors 408 includes a conventional sprocket and chain arrangement (not shown). A longitudinally extending pallet guide bar 414 is supported adjacent the left-most endless chain 408 as shown in FIG. 1, by the support framework 401 in a conventional manner (not shown).

As shown in FIG. 1, the pallet endless chain conveyors 408 are provided with a control means for effecting operation of the motor M4. The control means includes a photoelectric switch PE-8 mounted adjacent the receiving end of the endless conveyors. The upper run of pallet endless conveyors 408 are detailed in supporting relationship to be substantially coplanar with the upper run of endless conveyor means of the pallet loading section, whereby a loaded pallet can be transferred smoothly from the loaded pallet section to the loaded pallet transfer section without disturbing cans supported thereon.

The above described conveyor controls and the sequence of operation of the conveyor controls as it relates to the other palletizer controls will be described herein below in the operation.

PALLET MAGAZINE SECTION

The function of the pallet magazine section is to contain a stack or a series of pallets in storage and to dispense the pallets individually for use in the pallet loading section as needed. The pallet magazine section is located immediately adjacent to the pallet loading section and on an opposite side of the pallet loading section from the loaded pallet transfer conveyor section, as shown in FIGS. 2 and 3. The pallet magazine is contained on a support framework structure which includes two horizontally arranged support runners 501, 502, as shown in FIG. 2. The left end of the runners 501, 502 are connected to the palletizer framework of the pallet loading section with the right end of the runners as shown in FIG. 2 being supported by two floor contacting posts 503, 504. Extending vertically upward from each of the runners 501, 502 is a pair of laterally spaced posts 505, 506. The posts 506 are connected together by three horizontally extending and vertically spaced cross support beams 507, 508, and 509. Extending horizontally between posts 505 and 506 is a top connecting beam 510. Extending horizontally between posts 505 and 506 intermediate the top beam 510 and runner 501 is an intermediate beam 511. Supported on the back cross support beams 510 and 511 as shown in FIG. 2 are a series of vertically extending members 512. Supported on the palletizer magazine support framework posts 505 and 506 are a pair of formed palletizer plate guide means 513, 514. The formed plate guide means 513, 514 provide side pallet guide means and the vertically extending members 512 on the back of the pallet magazine provides a pallet stop for the back of the magazine. The front portion of the pallet magazine as shown in FIG. 2 is provided with an open area between the top connecting beam 510 and intermediate beam 511 to provide a pallet feeding open to permit pallets to be placed within the pallet magazine.

Referring now particularly to FIG. 30, the pallet magazine includes four pallet retaining lugs means 515. The pallet lug means 515 on the backside of the pallet magazine are on the left as shown in FIG. 30 are supported beneath cross-connecting beam 511. The pallet retaining lug means 515 on the front side of the pallet magazine or on the right as shown in FIG. 30 are supported beneath the cross-connecting beam 511. Each of the pallet retaining lugs includes a pallet retaining pin 516 supported for horizontal reciprocating movement in a support block 517. Each of the pins 516 includes a first extended end 518 which is supported in coplanar relationship and detailed for engaging and holding a pallet in a retaining position FIG. 31 and an opposite power controlled end 519. The retaining pin end 519 is connected by a short link 520 to a piston rod 521 FIG. 32. The piston rod 521 is operatively supported a power control cylinder 522. The cylinder 522 is supported adjacent the support block 517 by a pair of extending brackets 523, 524. The retaining pins 516 are controlled by the power control cylinder for effecting a movement of the pins from a pallet retaining position, as shown in FIG. 31, to a pallet releasing position in which the pins are moved to a dotted line position, as shown in FIG. 32. The sequence operation of the retaining pins will be described herein below.

As shown in FIG. 30, the pallet magazine includes a pallet receiving rack 530 operatively supported beneath the pallet retaining lug means for effecting movement of a pallet from the pallet magazine to a pallet conveyor. The pallet receiving rack 530 includes a pair of horizontally oriented and laterally spaced parallel pallet retaining bars 531. The pallet retaining bars are connected together in spaced relationship by a cross connecting member 532. A series of L-shaped brackets 534 are connected to the pallet receiving rack adjacent the four corners thereof. Each of the L-shaped brackets 534 is connected to an endless chain 535. The chains 535 are supported in vertically extending position by upper and lower support sprockets 536, 537, respectively. The lower support sprockets 537 are fixed to a cross connected shaft 538. The shaft 538 is mounted in conventional bearing block means 539. The upper support sprockets 536 are mounted on an upper cross support shaft 540. The shafts 540 are also supported by conventional bearing block means 541, only one of which is shown in FIG. 30. The left end of shafts 540 as shown in FIG. 30 include an extended end portion. The extended end portions of shafts 540 are drivingly connected together by a bevel gear means 542 and a connecting shaft 543. Connected to the extended end of one of the shafts 540 is a sprocket 544. Sprocket 544 is drivingly connected by a chain 545 to a second sprocket 546. The sprocket 546 is supported for rotation by a conventional gear box means 547 which is drivingly connected to a conventional power motor means 548. The motor drive means 547, 548 and the connecting shaft 543 are supported by a laterally extended framework means 459.

As shown in FIG. 30, the pallet magazine includes a pallet conveyor operatively supported beneath the pallet receiving rack 530. The pallet conveyor 550 includes a pair of laterally spaced endless chains 551, 552. The endless chains 551, 552 are rotatably supported by means of a series of sprockets 553. Two of the sprockets 553 are supported by a forward support shaft 554 and two of the sprockets 553 are supported by a rear cross support shaft 555. The shafts 554 and 555 are rotatably supported by conventional bearing block means 556, only one of which is shown in FIG. 30. The forward support shaft 554 includes and extended end 557 which is drivingly connected by a conventional chain and sprocket drive means 558 to an extended end of the elevator shaft 351, as shown in FIG. 2, such that the pallet conveyor 550 can be driven by the motor M-3 of the pallet conveyor in the pallet loading section. The endless chains 551, 552, include a framework support disposed intermediate front and rear shafts 554, 555 and below the upper run of the endless conveyors. The framework support includes two longitudinally extending members 533 connected in spaced relationship by two cross support members 533a.

The pallet magazine includes a series of sensing control switches. A first control switch LS-6 is supported on a horizontally extended framework member 511. Switch LS-6 includes a control arm 561 which is in operative engagement with a vertically extending pivotal crank 562. Pivotal movement of the link 562 will effect an actuation of the sensing switch LS-6. A second sensing switch LS-21 is supported on cross member 533a. Switch LS-21 includes a conventional control arm 564 which is in operative engagement with a pivoted link 565. Link 565 is pivotally connected at 566 to a second cross connected member 533a. Link 565 is spring biased upwardly by a compression spring means 567. Also supported on the pallet magazine is a third pallet sensing switch LS-11 which includes a control arm for sensing a predetermined location of a pallet.

The pallet receiving rack 530 includes an upper limit control switch LS-19 and a lower limit control switch LS-4. The upper limit switch LS-19 includes a control arm 571 in operative engagement with a sensing member 574 which is fixed to one of the endless chains 535. The lower limit switch LS-4 also includes a control arm 573 which is supported for engagement by the sensing member 574 to sense a lower limit position of the receiving rack 530. The pallet conveyor 550 also includes a photocell control PE-7 for maintaining operation of the conveyor 550 for a predetermined period of time. The sequence of operation of the pallet magazine control including sensing switches LS-4, LS-6, LS-19, LS-21 and PE-7 will be described herein below in the operation of the can palletizer.

OPERATION

Before operation of the palletizer can begin, a series or stack of slip-sheets must be placed in position on the slip-sheet storage bin 394 and a series of pallets must be positioned within the pallet magazine. The slip-sheets are positioned on the storage bin 294 by placing the slip-sheets on the cross support members 295 between the slip-sheet aligned guide members 297. In order to position pallets in the pallet magazine, the first pallet must be put into place by hand. This is accomplished by placing an empty pallet in position over the rear pallet retaining pins 516. A conventional manual over-ride switch shown in FIG. 33, must then be depressed to move the front pallet retaining pins 516 to a retracted position so that the pallet can be positioned in place for receiving the front retaining pins 516.

After the pallet has been positioned in proper alignment for receiving the pallet retaining pins on the front of the pallet magazine, the manual over-ride switch is released to allow the retaining pins 516 to return to their extended position thereby engaging the pallet, as shown in FIG. 31. Additional pallets can now be added to the first pallet, this can be either accomplished by hand or by the use of a conventional fork-lift truck which will position a series of pallets within the pallet magazine simultaneously. As shown in FIG. 31, the second pallet from the bottom will actuate limit LS-6. This switch insures that one pallet will always remain on the pallet retaining pins 516 so that a stack of pallets can easily be inserted into the magazine.

After a conventional start button, shown in the electrical diagram of FIG. 33, has been depressed to initiate an automatic operation of the can palletizer, the pallets will be fed from the pallet magazine to the pallet loading section in the following manner. When the start button is depressed, the pallet magazine receiving rack 530 which is controlled by the endless chain mechanism 535, will move upwardly until it actuates limit switch LS-19. The pallet receiving rack 530 is stopped in its upper limit position by actuating the upper limit switch LS-19 which will reverse the direction of drive to the chains 535 to thereby allow the pallet receiving rack to move downwardly. As the pallet receiving rack moves downwardly, the stack of pallets contained in the pallet magazine will move downwardly therewith, because the pallet retaining pins 516 have been moved to their retracted position by the making of limit switch LS-11.

Movement of the pallet receiving rack 530 away from the limit switch LS-11 will allow the pallet retaining pins to be moved to their extended pallet retaining positions. However, the amount of descent of the pallet receiving rack is sufficient to allow the bottom pallet of the stack to be moved below the pallet retaining pins, whereby when the pallet retaining pins 516 are moved to their extended position they will engage the second pallet contained in the stack of pallets. A continued downward movement of the pallet receiving rack 530 will cause the pallet carried thereby to actuate limit switch LS-21 which indicates that a pallet is in position on the pallet conveyor 550 and which will prevent the pallet magazine conveyor and pallet receiving rack from again attempting to retrieve another pallet. As described herein above in the description of the pallet magazine, the limit of downward movement of the pallet receiving rack is detailed such that it is allowed to move a slight amount below the pallet conveyor 550 so that the pallet will now be supported on the pallet conveyor for movement away from the pallet magazine.

The downward limit of movement of the pallet receiving rack is controlled by actuation of the limit switch LS-4 which will also initiate operation of the pallet infeed conveyor 550 to effect a movement of the pallet into the pallet loading section. Movement of a pallet along the pallet conveyor 550 into the pallet loading section will effect an actuation of the photoelectric cell PE-7 shown in FIG. 30. The photoelectric cell E-7 is provided with a timed delay control means which will stop the operation of the pallet infeed conveyor 550 and will effect an operation of the elevator mechanism 301, 306, etc., which is controlled by a pair of conventional hydraulic cylinders 331, 332.

The pallet loading section elevator will now ascend until it actuates an upper limit switch LS-12U shown in FIG. 20, and 21. The upper limit switch LS-12U is detailed in location to stop the pallet in proper alignment for receiving the first layer of cans to be placed thereon. The actuation of upper limit switch LS-12U also effects operation of the pallet retrieving conveyor and support rack 530, 535, etc., of the pallet magazine to move into position to retrieve a second pallet. After the second pallet has been retrieved, it is held in position on the pallet infeed conveyor means 550 until a signal has been received indicating that loaded pallet has been transferred from the pallet loading section onto the loaded pallet outfeed conveyor.

Depression of the start switch to effect an automatic sequence of operation of the can palletizer will also initiate an operation of the can infeed conveyor 11 to effect movement of cans in a single row along the upper run of the conveyor adjacent the infeed end 15. As the cans move through the orienting mechanism, 20, every other can passing therethrough will be placed on an opposite side of the conveyor 11 as the cans move along the outfeed end 16 of the conveyor. The first can of each beginning operation must be positioned in the orienting mechanism so that it will be placed along the side of the conveyor adjacent to the can push over bar 61. Proper placement of the first can along the push over bar 61 will effect an operation of the limit switch LS-13. If the first can is not in its proper position, limit switch LS-13 serves as a safety since it prevents the pushover bar from being actuated. To insure proper can order after the first can has been positioned in the proper position on the orienting mechanism 20, the rotation of the orienting mechanism is controlled by the pony brake above described which is adjusted to keep at least one can in the orienting mechanism at all times. As the cans move down the outfeed end 16 of the conveyor 11 into the pushover section they are guided by the pushover bar 61 on one side and the moveable gate 80 on the other side. The extended end portion 77a of the side guide rail 77 at the end of the infeed chain 11 helps to stabilize the lead can in a proper position.

A continuous movement of cans along the infeed conveyor 11 will allow cans to be accumulated behind the can stop portion 77a until the cans have backed up a sufficient amount to actuate the photoelectric cell PE-1. The photoelectric cell PE-1 is provided with a time delay control which can be adjusted to accur from 1 to 5 seconds after the photo cell is darkened. As long as the cans are moving with the conveyor 11, the photocell PS-1 can not be blocked long enough to actuate the relay. As an added insurance against prematurely actuating photoelectric cell PE-1, the photocell beam is detailed in location for operation by a can which in position and pressed against the side of the guide rail 49. Since the orienting mechanism does not position the can on the rail, they must back up before they will be pressed against the rail 49. As soon as the photoelectric cell PE-1 is actuated and all other conditions are clear, the power control cylinder 83 is operated to effect movement of the gage 80 to a retracted position. Movement of the gage 80 to the retracted position will effect an operation of the limit switch LS-14. The actuation of the limit switch LS-14 causes the push over bar 61 to move forward under control of the cylinder 68. The location of the limit switch LS-14 must be detailed such that as soon as the can guide or moveable gate 80 clears the bottoms of the outer rows of cans placed thereagainst, the push over will move forward. This time is critical because the infeed conveyor chain 11 continues to run after the moveable gate is down. If the cans are not pushed onto the accumulator tray immediately, they will be scattered onto the accumulator in a random fashion and possibly extra cans will enter the accumulator.

The function of the can push over mechanism 60 as above described, is threefold. It positions cans on the accumulator, blocks incoming cans while it is in its forward stroke and compresses the full layer of cans on its last stroke. FIG. 16 shows the can push over and accumulator just prior to the first cycle of operation of the cylinder and pushover mechanism. FIG. 17 shows the pushover mechanism 60 extended a predetermined amount to move the first two rows of cans into proper position on the accumulator. As the push over-bar 61 moves forward, the cans located in the path thereof will be moved onto the accumulator tray which is located slightly below the level of the upper run of the endless conveyor 11. As shown in FIG. 17, movement of the pushover bar 61 will cause the 19th can to push the 20th can into the accumulator tray. The 22nd through 24th can must be present to apply pressure to the 20th can and prevent it from sliding back down the infeed conveyor 11. As the 19th and 20th cans move forward, the stop bar 67 of the push over mechanism 60 catches the 21st can and prevents any other cans from moving into the pushover area. The extent of the first predetermined amount of movement of the push over bar 61 is controlled by the limit switch LS-5 which is actuated by the guide rod 62 after it has moved a predetermined amount. Operation of the limit switch LS-5 will effect control of the cylinder 68 to cause the cylinder to return the push bar to its retracted or home position. The limit switch LS-5 must be adjusted relative to the guide rod 62 so that each stroke of the push bar 61 will cause the cans to clear the moveable gate 80. This is accomplished by setting the speed of the pushover bar 61, then adjusting limit switch LS-5 so that the fourth stroke just clears the moveable gate 80. The adjustment of the cylinder 68 can be effected by the use of a conventional air valve which controls the speed in both directions of the cylinder 68. The forward speed of the push over bar 61 should be as fast as possible without scattering the cans on the accumulator. The retract speed should be much faster than the forward speed. This can be set by adjusting a conventional air cushion means on the rear of the cylinder 88 and the cylinder speed so that a smooth return will occur.

Figure 18:
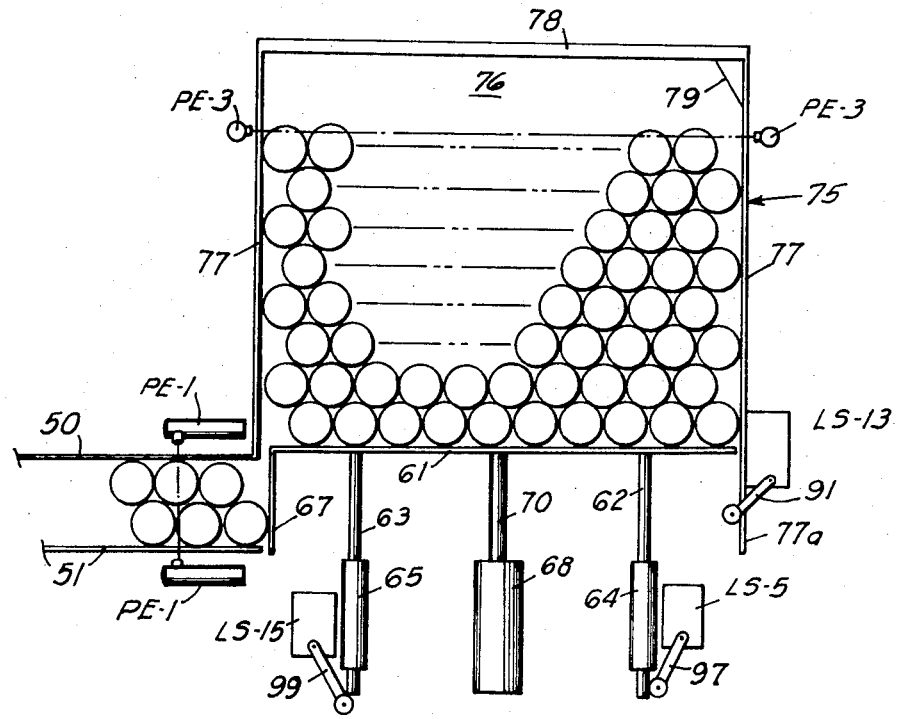
FIG. 18 is a schematic view similar to FIG. 17 showing the accumulation of a sufficient number of rows of cans to block a photoelectric sensing means.
Figure 19:
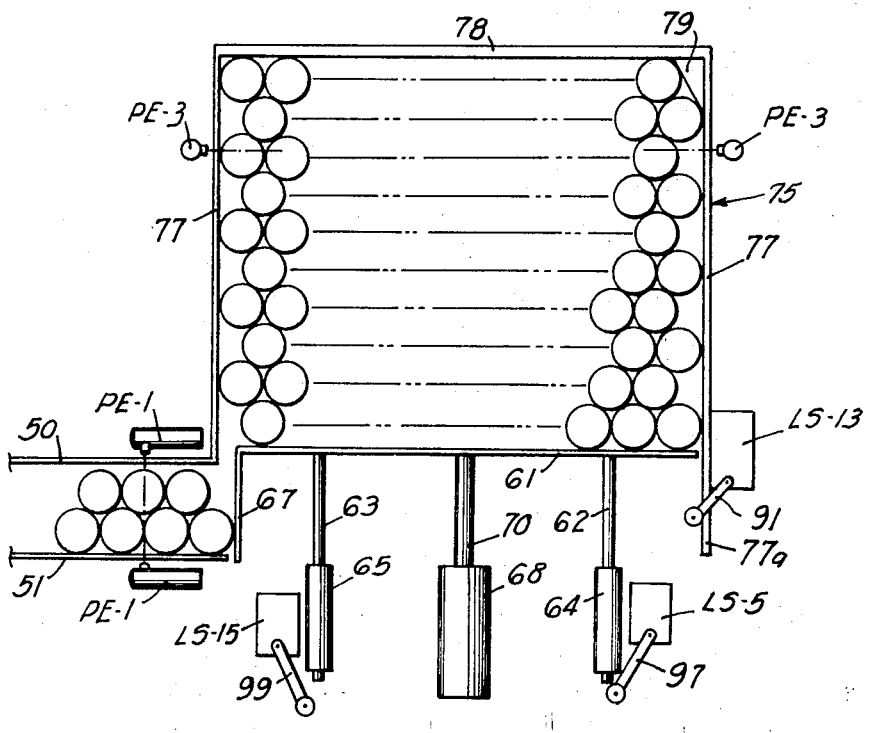
FIG. 19 is a schematic view similar to FIG. 17 showing the pushover mechanism extended a second predetermined amount to move the accumulated cans into a final accumulated position.

As stated hereinabove, in the description of the pushover mechanism, the next three strokes of the pushover mechanism 60 is the same as the first. On the fourth stroke as shown in FIG. 18, the leading row of cans will block the light beam to the photoelectric cell PE-3. When PE-3 is blocked the circuitry is set up so that the next stroke of the cylinder 68 will be the last one. On the last stroke as shown in FIG. 19, the pushover cylinder will be extended a second predetermined amount which is controlled by the actuation of the limit switch LS-15 by the guide rod 63. On the last stroke of the pushover bar 61, the cans are compressed slightly against the end member 78 such that the cans are contained within a predetermined area.

It is imperative that the two side guides 77 and the end members 78 present a straight guiding surface parallel to the upward direction of the movement of the layer of cans by the magnetic pick-up head, other wise the side guides 77 and end member 78 would drag cans off the magnet. The cans remain compressed by the pushover bar 61 until the magnetic stabilizing pan 246 is resting on top of the cans. At this time the pushover bar 61 returns to a retracted home position.

After the pushover bar has returned to its home position the cans will again be accumulated on the conveyor 11 in the pushover area. However, the pushover bar 61 cannot be moved forward again until the limit switch LS-1 which is shown in FIG. 10 is actuated to indicate that the transfer assembly has moved out of position over the accumulator tray to effect a transfer of the layer of cans contained thereon to the receiving pallet.

When the can palletizer is raised to place a layer of cans on the pallet, the magnetic pick-up head 240 will be in a position over the accumulator tray 76, the suction cups 286 will have a slip-sheet and a pallet will be in proper position as described above, on the pallet elevator. As soon as the pushover bar 61 has completed its last full stroke, a conventional stepper switch, as shown in FIG. 33, which control the function of the magnetic transfer assembly, will be stepped from position No. 1 to position No. 2, provided a slip-sheet is in position on the suction cups 286 to block a photoelectric cell PE-5 which senses the proper position of a slip-sheet over the pallet on the elevator. With the stepper switch (shown in FIG. 33) in position No. 2 the stabilizing pan 246 moves downwardly until it is resting on the top of cans located on the accumulator. The magnetic pick-up head moves downward until it is resting on the stabilizing pan 246. Simultaneously with the downward movement of the magnetic pick-up head, the suction cups 286 will move downwardly to press against a pallet on the elevator. A conventional pressure regulator means is provided for controlling the amount of pressure of the suction cups 286 against the pallet and the amount of pressure of the suction cups against the separator sheets located in the slip-sheet bin. In the downward movement of the stabilizing pan 246 and magnetic pick-up head 240, the pan 246 always leads the magnetic head 240. This is controlled by means of a conventional time delay valve means (not shown) which effects operation of the pneumatic cylinders 226–229.

Movement of the pan 246 downwardly will release limit switch LS-3 shown in FIG. 10 and 14. Actuation of the limit switch LS-3 will effect a movement of the stepper switch to the position No. 3. With the stepper switch in position No. 3 the magnetic pick-up head 240 stays downward in contact with the stabilizing pan 246 and the pan is moved upwardly by the pneumatic control cylinders 226–229. With the stepper switch in position No. 3, the suction cups 286 will also move upwardly and the vacuum applied thereto will be released to allow the slip-sheet to remain in place on the pallet. An upward movement of the stabilizing pan 246 and magnetic pick-up head 240 will again actuate limit switch LS-3 and an upward movement of the support plate 285 which supports the suction cups 286 will effect an actuation of limit switches LS-8A and LS-8B. The actuation of LS-3, LS-8A and LS-8B will effect a movement of the stepper switch to position No. 4. With the stepper switch in position No. 4 the power control cylinder 211 will be energized to effect a movement of the carriage 200 along the guide rails 298,299, to position the magnetic transfer head 240, 246, over the receiving pallet and simultaneously position the vacuum cups 286 over the slip-sheet storage bin 293. As the carriage 200 moves to a limit position to the left as shown in FIG. 10, the carriage will actuate a limit switch LS-9 which will stop any further forward movement of the carriage 200.

If a can should drop from the magnetic pick-up head 240 while the head is moving over the elevator, the photoelectric cell PE-2 which is supported on the carriage 200 will scan the accumulator tray 276 to sense a can out of position thereon which will in turn stop any further movement of the transfer assembly. When limit switch LS-9 is actuated by the carriage 200, the stepper switch will now move to position No. 5. In position No. 5, the stabilizing pan 246 is moved downwardly by the control cylinders 226-229 to place the cans in position on the receiving pallet. When the stepper switch is in position No. 5, the suction cups 286 will also be moved downwardly to contact a top slip-sheet located in the storage bin 294. A downwardly movement of the magnetic pick-up head and stabilizing pan to position the cans on the pallet will again actuate the limit switch LS-3 which will effect a movement of the stepper switch to position No. 6. In position No. 6, the magnetic pick-up head, pan, and suction cups are raised.

A conventional time delay valve is operatively associated with the control cylinders 226–229 and the magnetic head control cylinder 241 such that the magnetic pick-up head will be raised before the stabilizing pan 246 is raised. The separation of the magnetic pick-up head from the stabilizing pan will allow the cans to be moved out of the magnetic field developed by the magnetic head a sufficient amount to permit the cans to remain in place on the receiving pallet. Movement of the magnetic pick-up head 240 and stabilizing pan 246 upwardly will again effect an actuation of the limit switch LS-3 and an upward movement of the suction cups 286 will effect an actuation of limit switches LS-8A and LS-8B. This actuation of the limit switches LS-3, LS-8A, and Ls-8B will effect a movement of the stepper switch to position No. 7. In position No. 7, there is no change from the position No. 6 except that the pallet elevator is allowed to move downwardly until it clears photoelectric cell PE-4. When photoelectric cell PE-4 is clear, the stepper switch will move to position No. 8. In position No. 8, the carriage control cylinder 211 will again be actuated to effect a return of the can transfer mechanism 220 to a position over the accumulator 75 which will in turn, effect a movement of the suction cups 286 with a slip-sheet contained thereon to a position over the receiving pallet.

The rightward movement of the carriage will effect an operation of the limit switch LS-10 which will move the stepper switch to position No. 9. The stepper switch position No. 9 is identical to position No. 1. The above described cycle of operation of the can infeed and accumulator means, the can transfer assembly, and pallet elevator will be repeated until a predetermined number of layers of cans have been placed on the receiving pallet.

The above described illustrative embodiment of the palletizer is detailed to allow accumulation of eight layers of cans on the receiving pallet. After the eighth layer has been put into position on the receiving pallet, the magnetic pick-up head will move to actuate the limit switch LS-3 which will effect a downward movement of the pallet elevator mechanism until the limit switch LS-12D is actuated. Actuation of the limit switch LS-12D will stop downward movement of the elevator and start the operation of the motor M-3 which drives the loading section outfeed conveyor chains to effect a movement of a loaded pallet onto the loaded pallet transfer section. Movement of a loaded pallet onto the loaded pallet transfer section will effect an operation of the photoelectric cell PE-8 which initiates operation of the Motor -4 M-4 the conveyor chains associated with the loaded pallet transfer section a sufficient amount to allow the loaded pallet to clear the photoelectric cell PE-8 which stops operation of the conveyor motor drive M-4.

Operation of the pallet loading section conveyor 340 by the limit switch LS-12D will effect a movement of a second empty pallet from the magazine conveyor 550 into the pallet loading section for proper position on the pallet loading section elevator. After a loaded pallet has cleared the photoelectric cell PE-8, the pallet loading section elevator 301, 302, etc., will then be operated to move a second pallet into position for receiving the first layer of cans from the can transfer assembly.

A second full pallet will be removed from the pallet loading section in the same way as the first and the elevator will be again operated to receive the third pallet. Movement of the first loaded pallet onto the pallet transfer conveyor will effect an operation of limit switch LS-20. However, the conveyor associated with the loaded pallet transfer section will continue to run until the second pallet has cleared the photoelectric cell PE-8. The can palletizer herein described is designed to store three full pallets, two on the outfeed conveyor chains and one in the elevator. When the first pallet is removed from the outfeed chains, limit switch LS-20 is released (not shown). The limit switch LS-20 includes a conventional time delay means (not shown) which will allow a forklift truck driver sufficient time to remove the first loaded pallet from the outfeed chains after which time the actuation of the limit switch LS-20 effects operation of the outfeed conveyor motor M-4 to cause the second and third pallet to be moved into position on the loaded pallet transfer section.

It is to be understood that the above described pneumatic control cylinders and hydraulic control cylinders are provided with conventional solenoid control valves (not shown) to be operated by the above described conventional limit switches and photoelectric cells in the manner stated. Reference is made to FIG. 33 which illustrates the complete electrical circuit diagram for operation of the component parts of the can palletizer in an automatic sequence of operation. It is to be understood that the above described stepper switch shown in FIG. 33 and the relays and time control means shown in FIG. 33 are of conventional construction which forms no part of the present invention.

It now becomes obvious that the above described illustrative embodiment of the can palletizer is capable of obtaining the above stated objection and advantages. It is apparent that those skilled in the art may make modifications in the details of construction without departing from the spirit of the invention which is to be limited only by the scope of the appended claims.

What is claimed is:

1. An article accumulator system for use in arranging a multiplicity of articles into a predetermined pattern comprising, in combination:
   a. means supported on said system for successively feeding a series of articles along a first predetermined path;
   b. means supported on said system adjacent said feeding means for orienting said articles into two adjacent rows of longitudinally aligned articles, as the articles are moved along said first path, with the articles of one of said rows being longitudinally staggered in offset relationship with the articles of an adjacent row;

c. means supported on said system adjacent said successive feeding means for simultaneously moving said two rows of said oriented articles along a second predetermined path;
d. control means operatively associated with said simultaneous moving means for effecting operation of said moving means;
e. first sensing means operatively associated with said control means for rendering said control means effective in response to sensing the location of a predetermined article of one of said rows, said first sensing means detailed in location relative to said two rows of articles for sensing a correct longitudinally offset orientation of said two adjacent rows of articles; and,
f. second sensing means operatively associated with said control means for initiating a cycle of operation of said control means in response to actuation of said second sensing means, said second sensing means including a photocell detailed in angular location in such a manner as to only sense individual articles in said other row and being operable between an open and closed condition and wherein actuation of said second sensing means for initiating said cycle of operation is operable in response to said second sensing means being in said closed condition for a predetermined period of time and thus having sensed completion of sad predetermined pattern.

2. In an article accumulator system as described in claim 1, further characterized in that said simultaneous moving means is detailed for cyclic movement a first predetermined amount corresponding in distance to the width of said rows of oriented articles and wherein a first sensing means is operatively associated with said cyclic operation of said moving means for sensing said first predetermined amount and effecting a return of said moving means to a home position in response to completion of said first predetermined amount.

3. In an article accumulator system as described in claim 2, further characterized in that said simultaneous moving means is detailed for cyclic movement a second predetermined amount in response to movement of said rows of oriented articles a predetermined distance along said second predetermined path, sensing means operatively associated with movement of oriented articles along said second predetermined path for rendering said first cyclic operation sensing means inoperative, and wherein s second sensing means is operatively associated with said cyclic operation of said moving means for sensing said second predetermined amount and effecting a return of said moving means to a home position in response to completion of said second predetermined amount.

4. In an article accumulator system as described in claim 1, further characterized in that said successive feeding means includes a guide means adjacent each side of said feeding means for maintaining said articles in said oriented rows as they move along said first predetermined path, said guide means includes a moveable portion adjacent said simultaneous moving means mounted for movement between an extended guiding position and a retracted non-guiding position to allow oriented articles to be moved along said second predetermined path and wherein said moveable guide means includes control means operable in response to an actuation of said timed sensing means to effect movement of said moveable guide means to said retracted position.

5. In an article accumulator system as described in claim 1, further characterized in that said system includes an accumulator tray located adjacent said simultaneous moving means for receiving said oriented rows of simultaneously moved articles, and wherein said accumulator tray includes an abutment guide means for maintaining said oriented articles in correct staggered alignment in said rows.

6. In an article accumulator system as described in claim 1, further characterized in that said oriented articles are of cylindrical shape and wherein an offset article of one row is in abutting contact with two articles of an adjacent row.

7. In an article accumulator system as described in claim 1, further characterized in that said oriented articles are of cylindrical shape and wherein a common line drawn tangent to all the articles of one row will overlap and be substantially parallel to a common line drawn tangent to all the articles of an adjacent row.

8. In an article accumulator system as described in claim 1, further characterized in that said orienting means includes a pair of transversely spaced rotatable article orienting means, with one of said rotatable orienting means located adjacent each side of said article feeding means whereby an article moving along said feeding means will pass between said rotatable orienting means and wherein each of said rotatable orienting means includes a series of article receiving portions separated by article camming portions, with the article receiving portion of one rotatable means being in rotatable alignment with respect to the article camming portions of said other rotatable means.

9. In an article accumulator system as described in claim 1 further characterized in that said pair of rotatable orienting means are supported for counter-rotating movement and are detailed in spaced relationship relative to each other in such a manner that the article camming portion of one rotatable means will cam an article being fed thereto into the article receiving portion of the other rotatable means and wherein rotatable alignment means is operatively connected between said pair of rotatable orienting means for maintaining correct angular alignment between article receiving portions and article camming portions whereby successive articles being fed along said feeding means will be alternately moved to said oriented rows of articles.

* * * * *